(12) United States Patent
Nakagawa et al.

(10) Patent No.: US 9,020,275 B2
(45) Date of Patent: Apr. 28, 2015

(54) OTHER VIEWPOINT CLOSED SURFACE IMAGE PIXEL VALUE CORRECTION DEVICE, METHOD OF CORRECTING OTHER VIEWPOINT CLOSED SURFACE IMAGE PIXEL VALUE, USER POSITION INFORMATION OUTPUT DEVICE, METHOD OF OUTPUTTING USER POSITION INFORMATION

(75) Inventors: Masafumi Nakagawa, Tokyo (JP); Masato Kuroki, Tokyo (JP)

(73) Assignee: Shibaura Institute of Technology (JP)

( * ) Notice: Subject to any disclaimer, the term of this patent is extended or adjusted under 35 U.S.C. 154(b) by 271 days.

(21) Appl. No.: 13/812,991

(22) PCT Filed: Aug. 1, 2011

(86) PCT No.: PCT/JP2011/067583
§ 371 (c)(1),
(2), (4) Date: Apr. 4, 2013

(87) PCT Pub. No.: WO2012/015059
PCT Pub. Date: Feb. 2, 2012

(65) Prior Publication Data
US 2013/0216139 A1    Aug. 22, 2013

(30) Foreign Application Priority Data
Jul. 30, 2010   (JP) ................ 2010-172948

(51) Int. Cl.
*G06K 9/46* (2006.01)
*G06T 15/20* (2011.01)

(52) U.S. Cl.
CPC ............ *G06K 9/4604* (2013.01); *G06T 15/205* (2013.01)

(58) Field of Classification Search
None
See application file for complete search history.

(56) References Cited

U.S. PATENT DOCUMENTS 5,293,467 A * 3/1994 Buchner et al. ............... 345/422
5,682,198 A * 10/1997 Katayama et al. ............. 348/47
(Continued)

FOREIGN PATENT DOCUMENTS

| JP | 11-219438 | 8/1999 |
|---|---|---|
| JP | 2011-101444 | 4/2001 |
| JP | 2001-283201 | 10/2001 |

OTHER PUBLICATIONS

Sequeira et al. "Hybrid 3D reconstruction and image based rendering techniques for reality modelling," published in 2000.*

*Primary Examiner* — Vu Le
*Assistant Examiner* — Alexander J Lesnick
(74) *Attorney, Agent, or Firm* — Harness, Dickey & Pierce, P.L.C.

(57) ABSTRACT

A technology for creating an arbitrary viewpoint image with high quality based on pixel value information as seen from a single viewpoint and real spatial positional information has not been known. A hidden point is extracted based on a relative positional relationship between a single viewpoint closed surface projection point for arbitrary measurement point and neighboring projection point, a relative positional relationship between other viewpoint closed surface projection point for arbitrary measurement point and neighboring projection point, distance from arbitrary measurement point to another viewpoint, and distance from measurement point projected onto neighboring projection point on the other viewpoint closed surface to another viewpoint. Furthermore, the projection point pixel value on the other viewpoint closed surface for the extracted hidden point is corrected using distance from measurement point projected onto neighboring projection point on the other viewpoint closed surface to the other viewpoint and the measurement point pixel value.

18 Claims, 30 Drawing Sheets

(56) References Cited

U.S. PATENT DOCUMENTS 6,078,334 A      6/2000   Hanaoka et al.
6,327,381 B1 *  12/2001   Rogina et al. ................ 382/154
2009/0033740 A1 *  2/2009   Ishikawa et al. ................ 348/39
2009/0232388 A1 *  9/2009   Minear et al. ................ 382/154
2010/0118116 A1 *  5/2010   Tomasz et al. ................ 348/36

* cited by examiner $(X_V, Z_V) = (R_V \theta_R, Z_R R_V / R_R)$

OTHER VIEWPOINT CLOSED SURFACE IMAGE PIXEL VALUE CORRECTION DEVICE, METHOD OF CORRECTING OTHER VIEWPOINT CLOSED SURFACE IMAGE PIXEL VALUE, USER POSITION INFORMATION OUTPUT DEVICE, METHOD OF OUTPUTTING USER POSITION INFORMATION

FIELD OF THE INVENTION

The present invention relates to a correction apparatus for other viewpoint closed surface pixel value, a correction method for other viewpoint closed surface pixel value, an output apparatus for user location information, and an output method for user location information.

BACKGROUND ART

Conventionally, an apparatus and a method for generating an image for an arbitrary viewpoint on the basis of pixel value information as seen from a single viewpoint and real spatial positional (distance) information has been known. For example, in Japanese Unexamined Patent Application Publication No. 2001-283201, a generation method for 3D image data utilizing multiple viewpoint pixel image and multiple viewpoint distance image, and a generation method for arbitrary viewpoint image utilizing the 3D image data.

RELATED ART DOCUMENTS

Patent Document 1: Japanese Unexamined Patent Application Publication No. 2001-283201

DISCLOSURE OF THE INVENTION

Problems that the Invention Tries to Solve

A technology for creating an arbitrary viewpoint image with high quality on the basis of pixel value information as seen from a single viewpoint and real spatial positional information has not been known. The present invention provides an apparatus and a method for generating the arbitrary viewpoint image with high quality based on the pixel value information as seen from the single viewpoint and the real spatial positional information.

Means for Solving the Problems

In order to solve the above deficiencies, an aspect of the invention provides a correction apparatus for other viewpoint closed surface pixel value, comprising: an acquisition unit for point cloud data, acquiring real spatial positional information for a group of measurement points projectable onto a single viewpoint closed surface being a virtual closed surface centering around a single viewpoint, and point cloud data being pixel value information for real spatial positional information; an acquisition unit for coordinate information on single viewpoint closed surface, acquiring coordinate information on the single viewpoint closed surface, the coordinate information on the closed surface for a group of projection points acquired by projecting the group of measurement points on the single viewpoint closed surface; an acquisition unit for coordinate information on other viewpoint closed surface, acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface; an extraction unit for hidden point, extracting a hidden point on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint, the hidden point being a measurement point hidden behind a physical surface, where the data cannot be acquired when acquiring the point cloud data by centering around the other viewpoint; and a first correction unit for hidden point pixel value, correcting a pixel value of the projection point on the other viewpoint closed surface for the hidden point extracted by the extraction unit for hidden point by utilizing the distance from the measurement point projected onto the neighboring projection point on the other viewpoint closed surface to another viewpoint position and the pixel value of the measurement point.

Moreover, an aspect of the invention provides a correction method for other viewpoint closed surface pixel value, comprising the steps of: acquiring real spatial positional information for a group of measurement points projectable onto a single viewpoint closed surface being a virtual closed surface centering around a single viewpoint, and point cloud data being pixel value information for real spatial positional information; acquiring coordinate information on the single viewpoint closed surface, the coordinate information on the closed surface for a group of projection points acquired by projecting the group of measurement points on the single viewpoint closed surface; acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface; extracting a hidden point on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint, the hidden point being a measurement point hidden behind a physical surface, where the data cannot be acquired when acquiring the point cloud data by centering around the other viewpoint; and first correcting a pixel value of the projection point on the other viewpoint closed surface for the hidden point extracted by the step of extracting hidden point by utilizing the distance from the measurement point projected onto the neighboring projection point on the other viewpoint closed surface to another viewpoint position and the pixel value of the measurement point.

Effects of the Invention

According to the above configuration, it is possible to generate the arbitrary viewpoint image with high quality based on the pixel value information as seen from the single viewpoint and the real spatial positional information.

DETAILED DESCRIPTION OF THE INVENTION

Embodiments of the present invention will be described hereinafter. Relationship between Claims and Embodiments is as follows. The first embodiment will mainly describe Claims 1, 3, 7, and 9. The second embodiment will mainly describe Claims 2, 4, 8, and 10. The third embodiment will mainly describe Claims 5 and 11. The fourth embodiment will mainly describe Claims 6 and 12. The fifth embodiment will mainly describe Claims 7 and 15. The sixth embodiment will mainly describe Claims 8 and 16. The seventh embodiment will mainly describe Claims 17 and 18. The present invention is not to be limited to the above embodiments and able to be embodied in various forms without departing from the scope thereof.

<<First Embodiment>>
<Outline of First Embodiment>

In a correction apparatus for other viewpoint closed surface pixel value of a first embodiment, a hidden point, which is a measurement point hidden behind a physical surface, and where the point cloud data cannot be acquired when acquiring the point cloud data by centering around the other viewpoint, is extracted on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint. Moreover, the pixel value of the projection point on the other viewpoint closed surface for the extracted hidden point is corrected using distance from the measurement point projected onto the neighboring projection point on the other viewpoint closed surface to the other viewpoint and the pixel value the measurement point. According to the above feature, it is possible to generate the virtual closed surface image with high quality centering around the arbitrary viewpoint on the basis of the real spatial positional information and the pixel value information for a group of measurement points acquired by centering around the single viewpoint.

<Configuration of First Embodiment>

Figure 1:
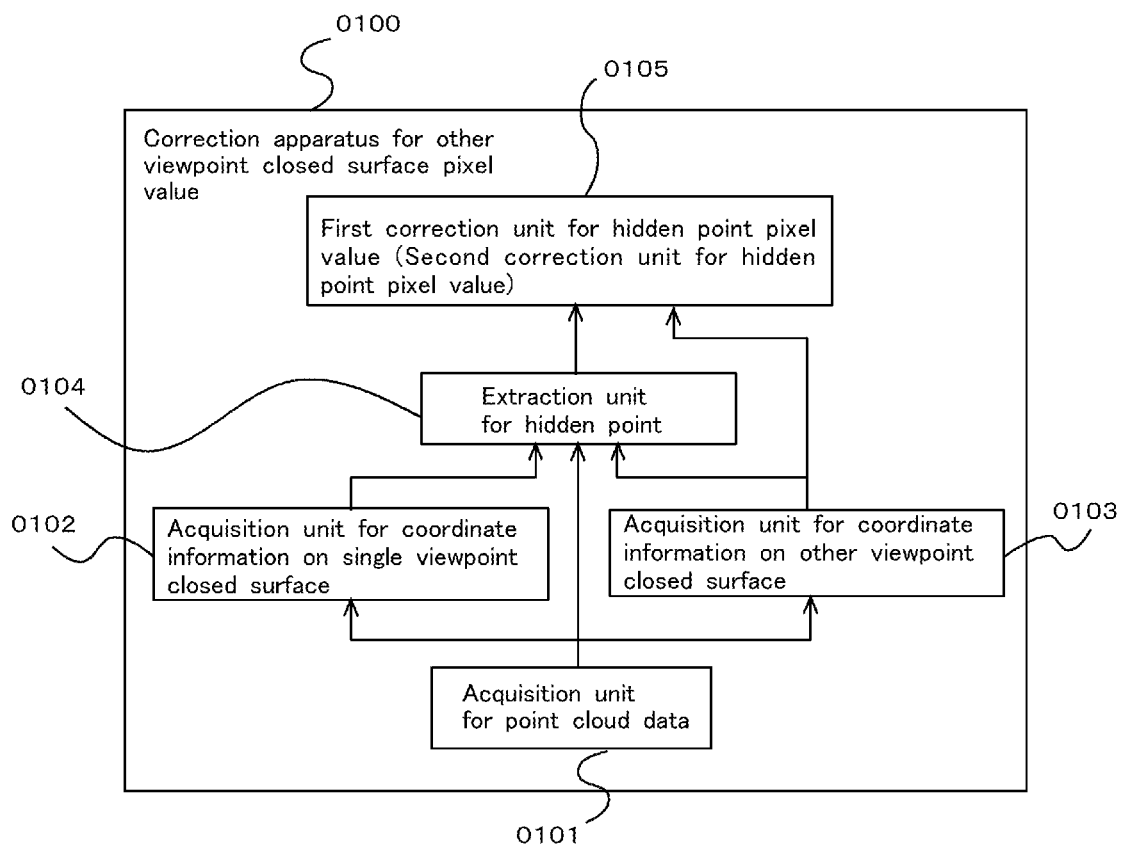
FIG. 1 is a diagram showing a configuration of a correction apparatus for other viewpoint closed surface pixel value a first embodiment.

FIG. 1 is a diagram showing a configuration of a correction apparatus for other viewpoint closed surface pixel value a first embodiment. As shown in FIG. 1, 'correction apparatus for other viewpoint closed surface pixel value' 0100 comprises an 'acquisition unit for point cloud data' 0101, an 'acquisition unit for coordinate information on single viewpoint closed surface' 0102, an 'acquisition unit for coordinate information on other viewpoint closed surface' 0103, an 'extraction unit for hidden point' 0104, and a 'first correction unit for hidden point pixel value (Second correction unit for hidden point pixel value)' 0105.

Note that, the functional block of the integrated interface device can be implemented by hardware, software, or both hardware and software. Moreover, the present invention can be implemented not only as an apparatus but also as a method thereof.

Moreover, a portion of such inventions may be configured as software. Furthermore, a software product used for causing a computer to execute the software, and the recording medium, in which the software is installed, should be included in the technical scope of the present invention (the same applies throughout the entire specification).

The 'acquisition unit for point cloud data' has a function of acquiring real spatial positional information for a group of measurement points projectable onto a single viewpoint closed surface being a virtual closed surface centering around a single viewpoint, and point cloud data being pixel value information for real spatial positional information.

Figure 2:
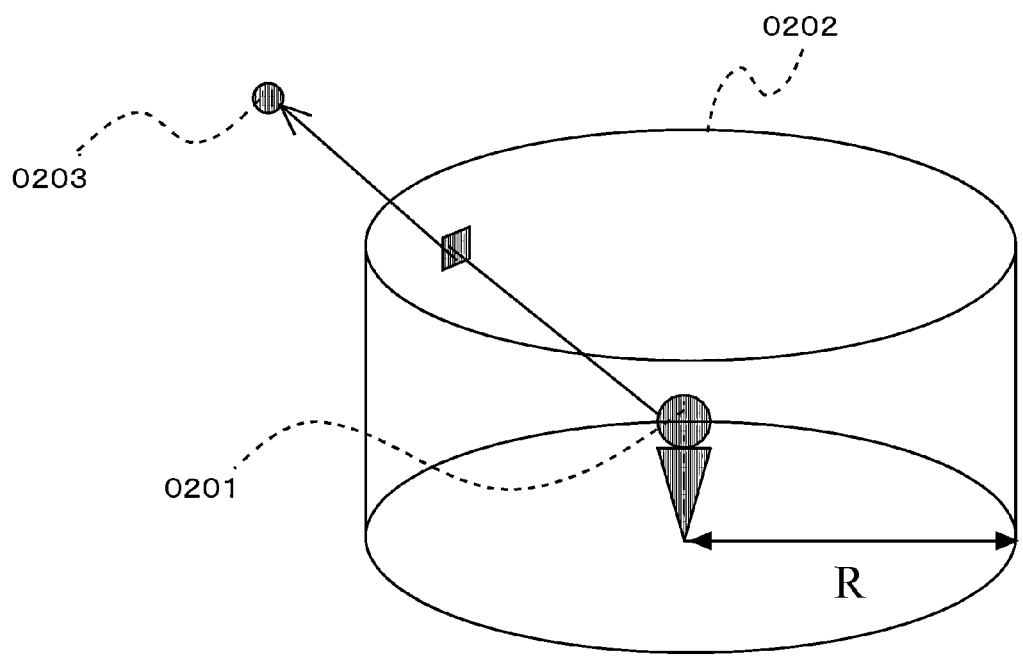
FIG. 2 is a diagram exemplifying a virtual closed surface centering around a single viewpoint.

Here, examples of the virtual closed surface include a cylindrical closed surface, a spherical closed surface, a semispherical closed surface, and a cubic closed surface. The virtual closed surface has a single viewpoint as the center, and a group of measurement points seen from the single viewpoint can be projected on the virtual closed surface. FIG. 2 is a diagram exemplifying the virtual closed surface centering around the single viewpoint. As shown in FIG. 2, a measurement point 0203 within the scope of 360 degrees in a horizontal direction can be projected on the cylindrical virtual closed surface 0202, having a radius R and centering around a viewpoint 0201. Accordingly, it is possible to acquire a panoramic image centering around the single viewpoint.

The real special coordinate of the group of measurement points can be specified by various coordinate systems such as Cartesian coordinate system, cylindrical coordinate system, polar coordinate system, and is not limited to any one of them. Note that it is preferable to select a suitable coordinate system according to virtual closed surface.

Examples of the pixel value information include information of luminance and brightness (light intensity), saturation information, and color phase information. For example, color component value of three primary colors may be acquired as the color phase information.

The above measurement point cloud information can be acquired by utilizing a laser scanner capable of acquiring the point cloud data on a surface within the scope of 360 degrees in a horizontal direction. The scanner can acquire a distance from a viewpoint to a measurement point based on a response time of laser reflection, and moreover, can specify the real special positional information with the information of direction of laser emission. Moreover, a configuration where the data acquired by such devices are acquired from storage device capable of storing the data via the network is applicable.

The 'acquisition unit for coordinate information on single viewpoint closed surface' has a function of acquiring coordinate information on the single viewpoint closed surface, the coordinate information on the closed surface for a group of projection points acquired by projecting the group of measurement points on the single viewpoint closed surface.

The closed surface coordinate information of the group of measurement points can be specified by various coordinate systems such as Cartesian coordinate system, cylindrical coordinate system, polar coordinate system Note that it is preferable to select a suitable coordinate system (e.g. the cylindrical coordinate system or polar coordinate system, centering around the single viewpoint) according to virtual closed surface similar to the case of real special positional information.

Specifically, the acquisition unit for coordinate information on single viewpoint closed surface is configured by a processing unit such as CPU and MPU, and a storage device such as RAM. Moreover, the single viewpoint closed surface can be acquired by calculating the intersection point of a vector extending from the single viewpoint to the measurement point and the virtual closed surface.

Figure 3:
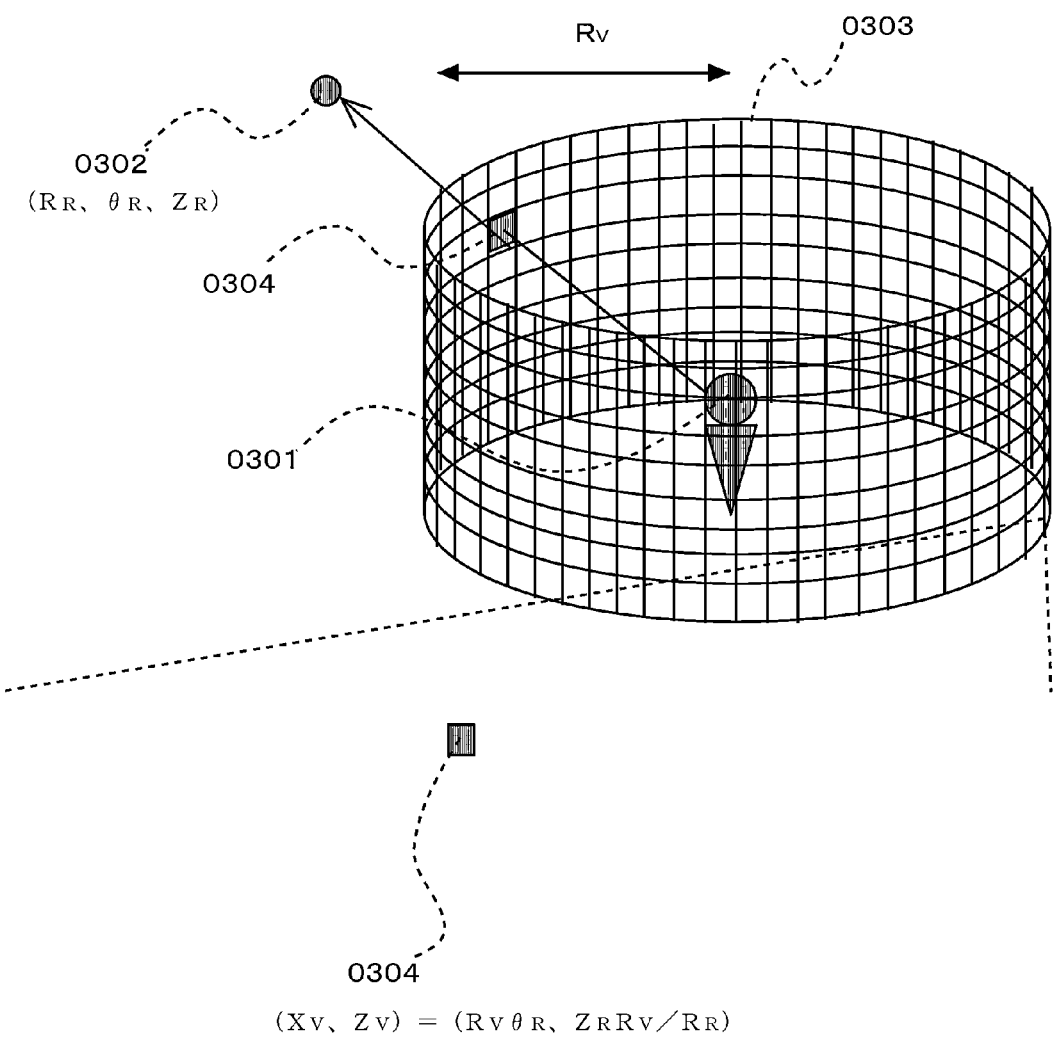
FIG. 3 is a diagram exemplifying an acquisition of coordinate information on the single viewpoint closed surface.

FIG. 3 is a diagram exemplifying an acquisition of coordinate information on the single viewpoint closed surface. In FIG. 3, a single viewpoint closed surface coordinate of a projection point 0304 $(X_v, Z_v)=(R_V \theta_R, Z_R R_V/R_R)$ is calculated by a real special coordinate $(R_R, \theta_R, Z_R)$ and a measurement point 0302 viewed from a single viewpoint 0301 and a radius $R_v$ of a cylindrical virtual closed surface 0303.

Therefore, for the respective measurement points, the single viewpoint closed surface coordinate is acquired and the pixel information is allocated to the coordinate position, thereby virtually expressing the surrounding special information on the virtual closed surface centering around the single viewpoint.

The 'acquisition unit for coordinate information on other viewpoint closed surface' has a function of acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface.

Figure 4:
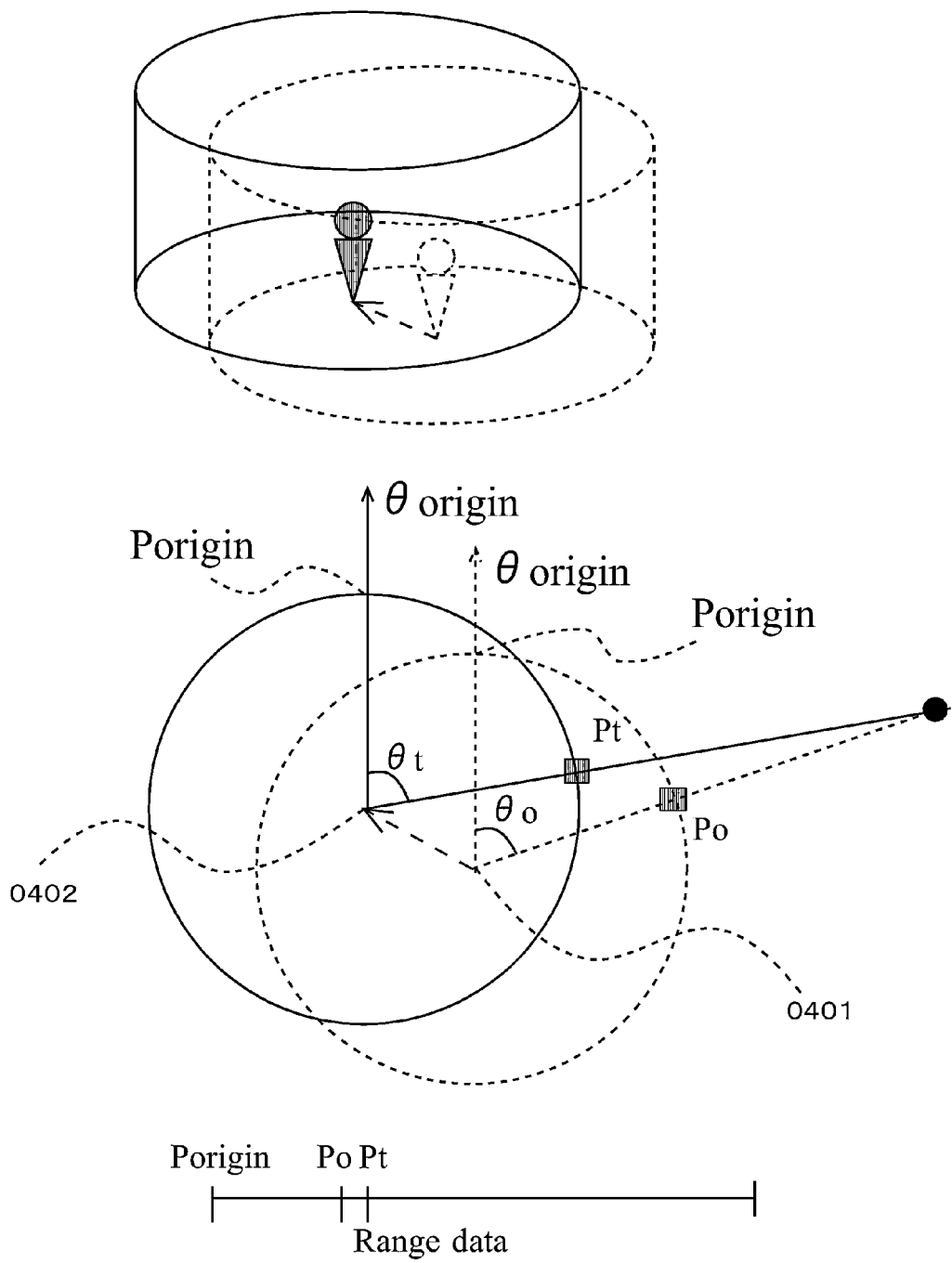
FIG. 4 is a diagram showing variation of coordinate on the closed surface of a projection point on the virtual closed surface.

FIG. 4 is a diagram showing variation of coordinate on the closed surface of a projection point on the virtual closed surface. As shown in FIG. 4, when moving from single viewpoint 0401 to other viewpoint 0402, an intersection between a line segment connecting a measurement point and the viewpoint moves, thereby varying the virtual closed surface coordinate.

Figure 5:
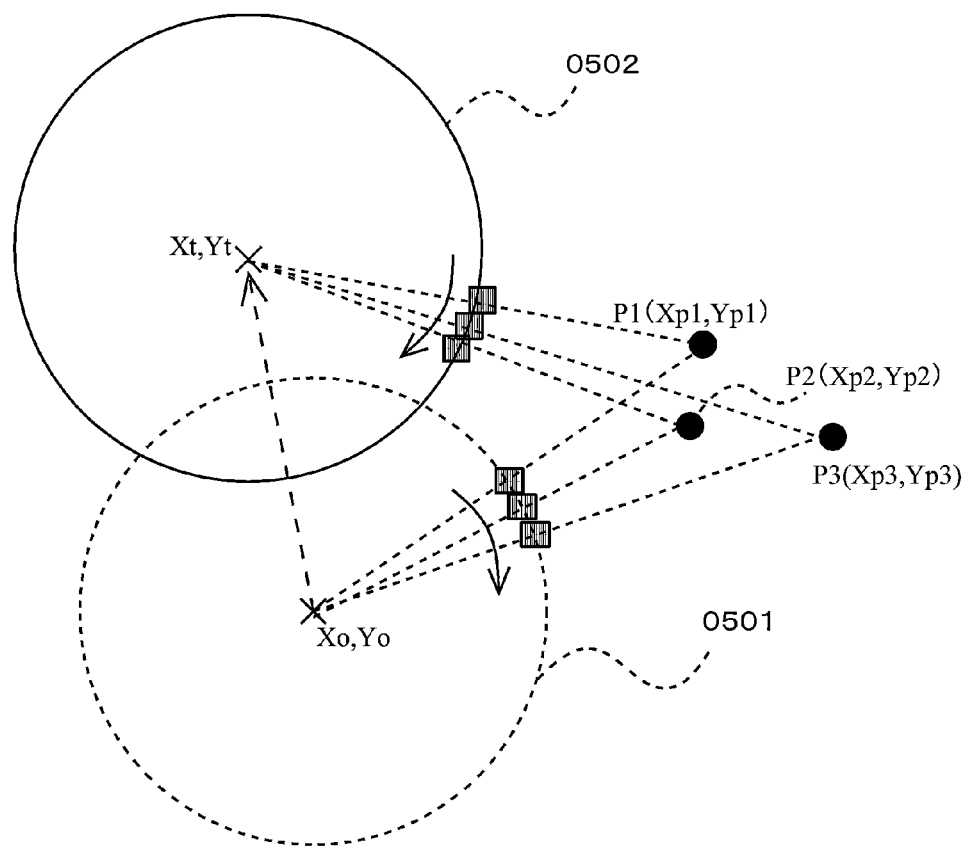
FIG. 5 is a diagram showing variation of relative positional relationship on the closed surface of the projection point on the virtual closed surface.

FIG. 5 is a diagram showing variation of relative positional relationship on the closed surface of the projection point on the virtual closed surface. As shown in FIG. 5, on a single viewpoint closed surface 0501 centering around a single viewpoint, projection points for a measurement points P1, P2, and P3 are located in order of P1, P2, and P3 clockwise (rightward in horizontal direction), and meanwhile, on other viewpoint closed surface 0502 centering around other viewpoint, projection points for measurement points P1, P2, and P3 are located in order of P1, P3, and P2 clockwise (rightward in horizontal direction).

The 'extraction unit for hidden point' has a function of extracting a hidden point, which is a measurement point hidden behind a physical surface, and where the point cloud data cannot be acquired when acquiring the point cloud data by centering around the other viewpoint, on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint.

Figure 6:
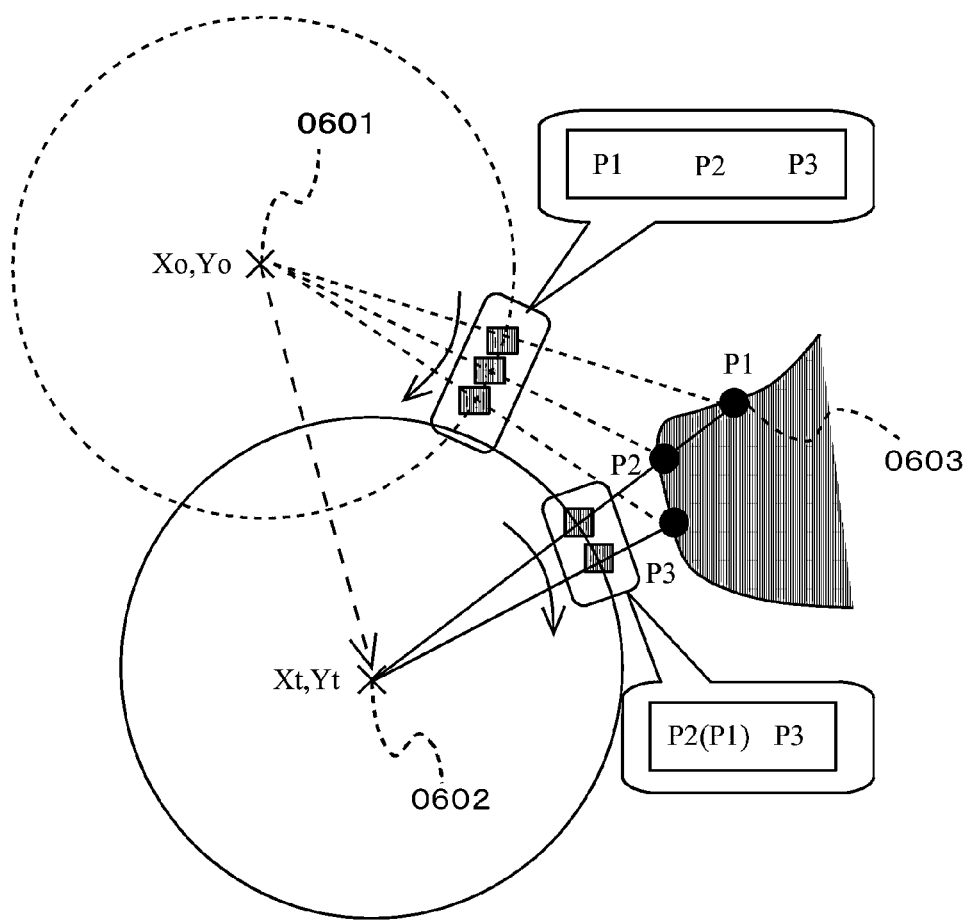
FIG. 6 is a diagram showing an example of extraction of a hidden point by an extraction unit for hidden point.

FIG. 6 is a diagram showing an example of extraction of a hidden point by an extraction unit for hidden point. When viewing from a single viewpoint 0601 ($X_0, Y_0$) to the measurement points P1, P2 and P3, the projection points thereof on the single viewpoint closed surface are located in order of P1, P2, and P3 clockwise (rightward in horizontal direction), and meanwhile, when viewing from other viewpoint 0602 ($X_t, Y_t$) to the measurement points P1, P2 and P3, the projection points for P1 and P2 overlaps, and the projection points for P3 is located clockwise (rightward in horizontal direction).

Since the data of the group of measurement points are measured by centering around the single viewpoint, a relative positional relationship of projection points on the single viewpoint closed surface reflects a relative positional relationship of measurement points in the real space. Therefore, in the case of FIG. 6, the measurement points P1, P2 and P3 are continuously located in the order of P1, P2 and P3 clockwise by centering around the single viewpoint also in the real space.

Meanwhile, on the other viewpoint closed surface, when virtually acquiring the point cloud data by centering around the other viewpoint, even the hidden point, which is a measurement point hidden behind a physical surface, and where the point cloud data cannot be acquired when acquiring the point cloud data by centering around the other viewpoint, is projected. In the case of FIG. 6, the measurement points P1 is a measurement point hidden behind a physical surface connecting P1, P2 and P3, where the pixel value data etc. cannot be acquired, so that such measurement point (hidden point) is not to be projected on the other viewpoint closed surface.

Specifically, at the outset, the relative positional relationship between projection points on the single viewpoint closed surface and the relative positional relationship between projection points on the other viewpoint closed surface are compared, a pair of projection points (in FIG. 6, projection points for P1 and P2), where the relative positional relationship varies, are extracted, and it is determined the farther measurement point (P1 in FIG. 6) among the respective measurement points projected on the respective projection points of the pair for the other viewpoint on the basis of the distance from the other viewpoint to the measurement point, thereby extracting the measurement point, which is located farther than the other viewpoint, as the hidden point.

Figure 7:
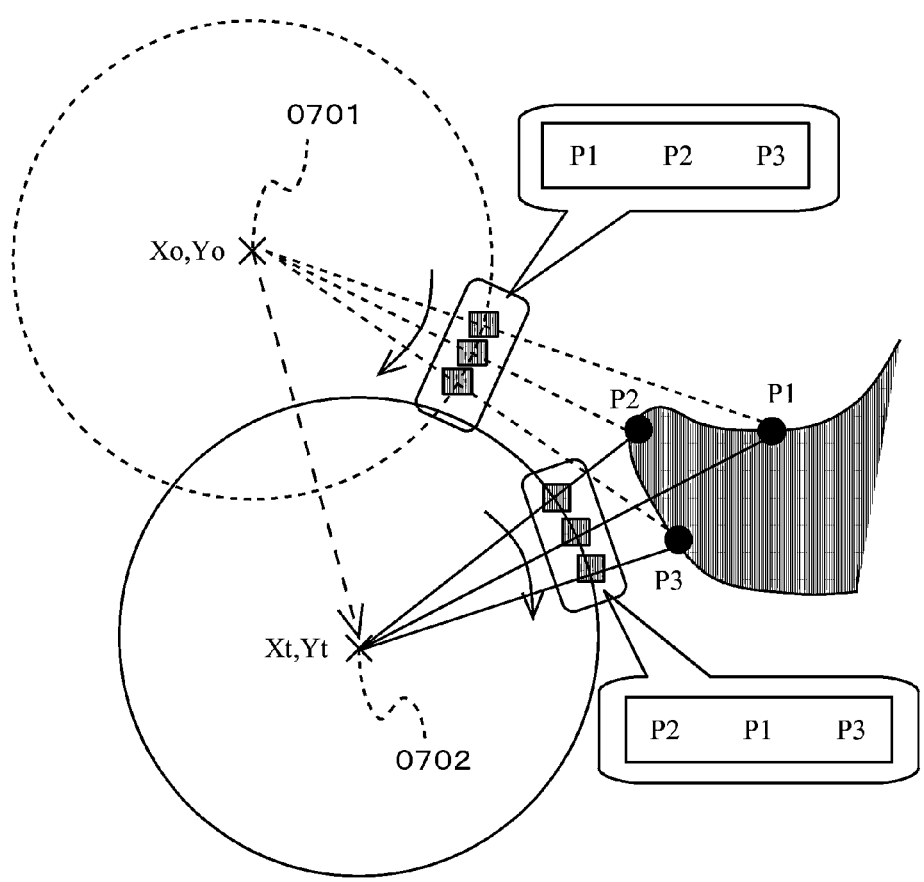
FIG. 7 is a diagram showing another example of extraction of a hidden point by an extraction unit for hidden point.

FIG. 7 is a diagram showing another example of extraction of a hidden point by an extraction unit for hidden point. When viewing from a single viewpoint 0701 ($X_0, Y_0$) to the measurement points P1, P2 and P3, the projection points thereof on the single viewpoint closed surface are located in order of P1, P2, and P3 clockwise (rightward in horizontal direction), and meanwhile, when viewing from other viewpoint 0702 ($X_t, Y_t$) to the measurement points P1, P2 and P3, the projection points for measurement points P1, P2, and P3 are located in order of P2, P1 and P3 clockwise (rightward in horizontal direction).

Here, since a relative positional relationship (located in order of P1, P2 and P3 clockwise) between a projection point on the single viewpoint closed surface for the arbitrary measurement point (P1) and projection points (P2 and P3) neighboring the projection point on the single viewpoint closed surface for the arbitrary measurement point is established, the physical surface has continuity as P1, P2 and P3. Moreover, from the continuity information, and the relative positional relationship (located in order of P2, P1 and P3 clockwise) between the projection point on the other viewpoint closed surface for the arbitrary measurement point (P1) and projection points (P2 and P3) neighboring the projection point on the other viewpoint closed surface for the arbitrary measurement point, there is a possibility that any one of P1 and P2 is the hidden point. Subsequently, on the basis of distance from the arbitrary measurement point (P1) to the other viewpoint, and distance from the measurement point (P2) projected onto the neighboring projection point on the other viewpoint closed surface to the other viewpoint, it is determined that the arbitrary measurement point (P1) is located farther than the other viewpoint (P2) projected onto the neighboring projection point, thereby determining that the arbitrary measurement point (P1) is hidden behind the physical surface connecting P2 and P3.

The 'first correction unit for hidden point pixel value' has a function of correcting a pixel value of the projection point on the other viewpoint closed surface for the hidden point extracted by the extraction unit for hidden point by utilizing the distance from the measurement point projected onto the neighboring projection point on the other viewpoint closed surface to another viewpoint position and the pixel value of the measurement point.

Since the hidden point extracted by the extraction unit for hidden point is originally hidden behind the physical surface and is not projected on the other viewpoint closed surface, the hidden point is to be replaced to a pixel value of the point on the physical surface. The pixel value of the point on the physical surface can be estimated by utilizing a pixel value of the neighboring measurement point on the physical surface. The extraction of the measurement point on the physical surface can be carried out by determining single or plural measurement point at a nearer point for the other viewpoint by utilizing the distance from the other viewpoint to the measurement point.

In the case of FIG. 7, from the distance from the measurement point projected onto the neighboring projection point on the other viewpoint closed surface to the other viewpoint 0702, the neighboring measurement points (P2 and P3), which are nearer for the other viewpoint, are extracted, thereby using an average value of the pixel values of the measurement points as a new pixel value. Moreover, it is possible to correct the pixel value of the hidden point by utilizing not only the pixel value of the neighboring projection point in the horizontal direction but also the pixel value of the neighboring projection point in the vertical direction.

Moreover, as substitute for the first correction unit for hidden point pixel value, a second correction unit for hidden point pixel value can be used. The 'second correction unit for hidden point pixel value' has a function of correcting the pixel value of the projection point on the other viewpoint closed surface for the hidden point, extracted by the extraction unit for hidden point, using distance from the hidden point to the other viewpoint, and the distance from the measurement point projected onto the neighboring projection point on the other viewpoint closed surface to another viewpoint position and the pixel value of the measurement point.

The difference from the first correction unit for hidden point pixel value is that distance from the hidden point to the other viewpoint is utilized upon correcting the pixel value of the projection point on the other viewpoint closed surface for the hidden point. According to this configuration, when the distance from the hidden point to the other viewpoint and the distance form the distance from the measurement point projected onto the neighboring projection point on the other viewpoint closed surface to another viewpoint position and the pixel value of the measurement point are almost equal, the pixel value of the hidden point can be utilized as the pixel value of the projection point on the other viewpoint closed surface without change, thereby increasing contribution of the pixel value of the hidden point to the correction process.

<Concrete Configuration of First Embodiment>

Figure 8:
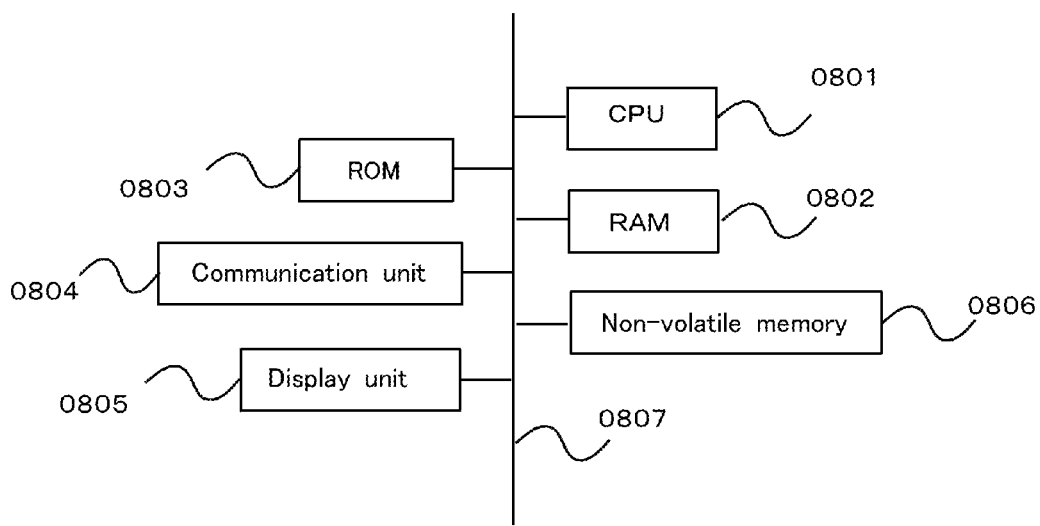
FIG. 8 is a diagram exemplifying a hardware configuration of the correction apparatus for other viewpoint closed surface pixel value of the first embodiment.

FIG. 8 is a diagram exemplifying a hardware configuration of the correction apparatus for other viewpoint closed surface pixel value of the first embodiment. The operation of the hardware components will be described with reference to FIG. 8. As shown in FIG. 8, the correction apparatus for other viewpoint closed surface pixel value is provided with a 'CPU' 0801, a 'RAM' 0802, a 'ROM' 0803, a 'communication unit' 0804, a 'display unit' 0805, and a 'non-volatile memory' 0806. These components are mutually connected through the data communication path of 'system bus' 0807, thereby carrying out transmission/reception and processing of the information.

At the outset, the CPU acquires real spatial positional information for a group of measurement points projectable onto a single viewpoint closed surface being a virtual closed surface centering around a single viewpoint, and point cloud data being pixel value information for real spatial positional information (acquisition process for point cloud data).

Specifically, the real special positional information (e.g. coordinate values X, Y, Z, distance, horizontal angle, and vertical angle) of the group of measurement points and the pixel value information thereof (e.g. RGB color information) are acquired by utilizing a laser scanner capable of acquiring the point cloud data on a surface within the scope of 360 degrees in a horizontal direction, correlated with ID of the respective measurement points, and stored in the non-volatile memory. Note that the data may not be acquired directly from the measurement device such as the laser scanner, and may be acquired from the storage device managing the data.

Subsequently, the CPU acquires the coordinate information on the single viewpoint closed surface, which is coordinate information on the closed surface for a group of projection points acquired by projecting the group of measurement points on the single viewpoint closed surface (acquisition process for coordinate information on single viewpoint closed surface).

Specifically, on the basis of the real spatial positional information for the group of measurement points, the closed surface coordinate information to be acquired when projecting the respective measurement points on the single closed surface is calculated. The calculation results are correlated with IDs of the respective measurement points, and are stored at a predetermined address in the RAM.

Subsequently, the CPU acquires the coordinate information on other viewpoint closed surface being a virtual closed surface centering around another viewpoint different from the single viewpoint, which is coordinate information on the closed surface for a group of projection points acquired by projecting the group of measurement points on the other viewpoint closed surface (acquisition process for coordinate information on other viewpoint closed surface).

Specifically, on the basis of the real spatial positional information for the group of measurement points, the closed surface coordinate information to be acquired when projecting the respective measurement points on the other closed surface is calculated. The calculation results are correlated with IDs of the respective measurement points, and are stored at a predetermined address in the RAM.

Subsequently, the CPU extracts the hidden point, which is a measurement point hidden behind a physical surface, and where the data cannot be acquired when acquiring the point cloud data by centering around the other viewpoint, on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint (extraction process for hidden point).

Specifically, vertical and horizontal orders of a projection point on the single viewpoint closed surface for marked measurement point and neighboring projection points are correlated with the IDs of the respective measurement points, and acquired. Subsequently, vertical and horizontal orders of a projection point on the other viewpoint closed surface for the marked measurement point and neighboring projection points are correlated with the IDs of the respective measurement points, and acquired. Subsequently, the order of the respective measurement points on the single viewpoint closed surface and the order of the respective measurement points on the other viewpoint closed surface are compared, and distances from the respective measurement points projected onto plurality of projection points, where the order varies on the other viewpoint closed surface, to the other viewpoint are compared, thereby extracting the viewpoint located farther than the other viewpoints as the hidden point.

Subsequently, the CPU corrects a pixel value of the projection point on the other viewpoint closed surface for the hidden point extracted by the extraction unit for hidden point by utilizing the distance from the measurement point projected onto the neighboring projection point on the other viewpoint closed surface to another viewpoint position and the pixel value of the measurement point (first correction process for hidden point pixel value).

Specifically, distance from the measurement point projected onto neighboring projection point on the other viewpoint closed surface to the other viewpoint is calculated. Here, the measurement points projected onto neighboring projection point are divided into a group having distance smaller than a predetermined threshold, and a group having distance greater than a predetermined threshold, and an average value of pixel values of the group having distance smaller than a predetermined threshold is calculated. Subsequently, the pixel value of the projection point on the on the other viewpoint closed surface for the hidden point is replaced with the average value.

Moreover, as substitute for the first correction process for hidden point pixel value, the CPU may correct the pixel value of the projection point on the other viewpoint closed surface for the hidden point, extracted by the extraction unit for hidden point, using distance from the hidden point to the other viewpoint, and the distance from the measurement point projected onto the neighboring projection point on the other viewpoint closed surface to another viewpoint position and the pixel value of the measurement point (second correction process for hidden point pixel value).

Specifically, distance from the hidden point to the other viewpoint, and, distance from the measurement point projected onto neighboring projection point on the other viewpoint closed surface to the other viewpoint are calculated. Here, the measurement points projected onto neighboring projection point are divided into a group having distance smaller than a predetermined threshold, and a group having distance greater than a predetermined threshold, and an average values of pixel values and distances to the other viewpoints of the group having distance smaller than a predetermined threshold are calculated. Subsequently, when a difference between the distance from the hidden point to the other viewpoint and the average value of distances to the other viewpoints of the group having distance smaller than a predetermined threshold is within a predetermined range, the pixel value of the projection point on the on the other viewpoint closed surface for the hidden point is replaced with the average value.

<Processing Flow of First Embodiment>

Figure 9:
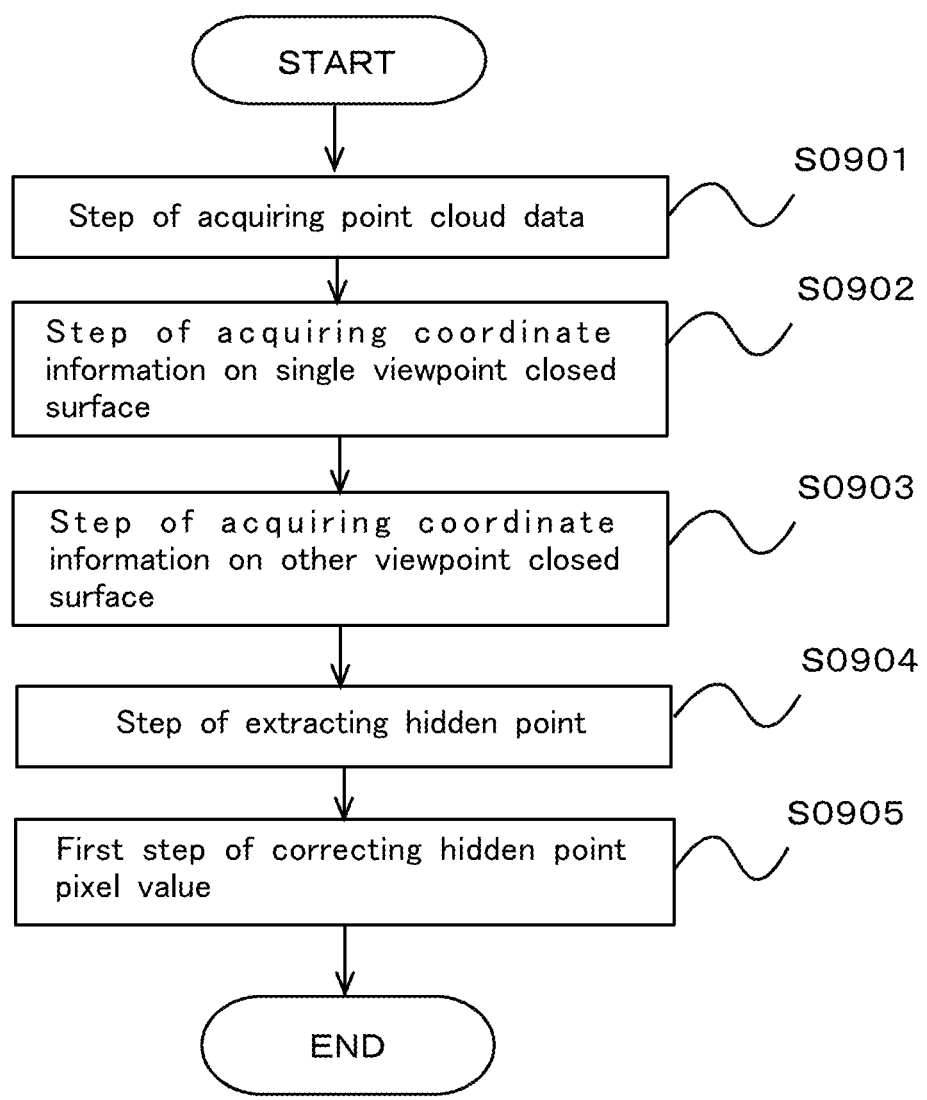
FIG. 9 is a flowchart of the correction method for other viewpoint closed surface pixel value of the first embodiment.

FIG. 9 is a flowchart of the correction method for other viewpoint closed surface pixel value of the first embodiment. The process of FIG. 9 includes the following steps. In a step S0901, the real spatial positional information for a group of measurement points projectable onto a single viewpoint closed surface being a virtual closed surface centering around a single viewpoint, and point cloud data being pixel value information for real spatial positional information are acquired (step of acquiring point cloud data). Subsequently, in a step S0902, the coordinate information on the single viewpoint closed surface, which is coordinate information on the closed surface for a group of projection points acquired by projecting the group of measurement points on the single viewpoint closed surface, is acquired (step of acquiring coordinate information on single viewpoint closed surface). Subsequently, in a step S0903, the coordinate information on other viewpoint closed surface being a virtual closed surface centering around another viewpoint different from the single viewpoint, which is coordinate information on the closed surface for a group of projection points acquired by projecting the group of measurement points on the other viewpoint closed surface, is acquired (step of acquiring coordinate information on other viewpoint closed surface). Subsequently, in a step S0904, the hidden point, which is a measurement point hidden behind a physical surface, and where the data cannot be acquired when acquiring the point cloud data by centering around the other viewpoint, is extracted on the basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint (step of extracting hidden point). Subsequently, in a step S0905, the pixel value of the projection point on the other viewpoint closed surface for the hidden point extracted by the extraction unit for hidden point is corrected by utilizing the distance from the measurement point projected onto the neighboring projection point on the other viewpoint closed surface to another viewpoint position and the pixel value of the measurement point (first step of correcting hidden point pixel value). Moreover, as substitute for the first step of correcting hidden point pixel value, the pixel value of the projection point on the other viewpoint closed surface for the hidden point, extracted by the extraction unit for hidden point, is corrected by using distance from the hidden point to the other viewpoint, and the distance from the measurement point projected onto the neighboring projection point on the other viewpoint closed surface to another viewpoint position and the pixel value of the measurement point (second step of correcting hidden point pixel value).

<Brief Description of Effects of First Embodiment>

According to the correction apparatus for other viewpoint closed surface pixel value of the first embodiment, it is possible to generate the virtual closed surface image with high quality centering around the arbitrary viewpoint on the basis of the real spatial positional information and the pixel value information for a group of measurement points acquired by centering around the single viewpoint.

<<Second Embodiment>>

<Outline of Second Embodiment>

A correction apparatus for other viewpoint closed surface pixel value of a second embodiment is basically the same as that of the first embodiment, and when correcting the pixel value of the projection point on the other viewpoint closed surface for the hidden point, extracts a first nearest projection point from a first marked point cloud, where first nearest projection point is a projection point for a measurement point with shortest distance to the other viewpoint, the first marked point cloud being a group of projection points neighboring the projection point on the other viewpoint closed surface for the hidden point extracted by the extraction unit for hidden point, extracts a first short-range projection point from the first marked point cloud, where the first short-range projection point is a projection point for a measurement point within a predetermined range from the measurement point projected onto the first nearest projection point, and corrects the pixel value of the projection point on the other viewpoint closed surface for the hidden point by utilizing the pixel value of the first nearest projection point and the first short-range projection point. According this feature, it is possible to generate the virtual closed surface image with high quality centering around the arbitrary viewpoint on the basis of the real spatial positional information and the pixel value information for a group of measurement points acquired by centering around the single viewpoint.

<Configuration of Second Embodiment>

Figure 10:
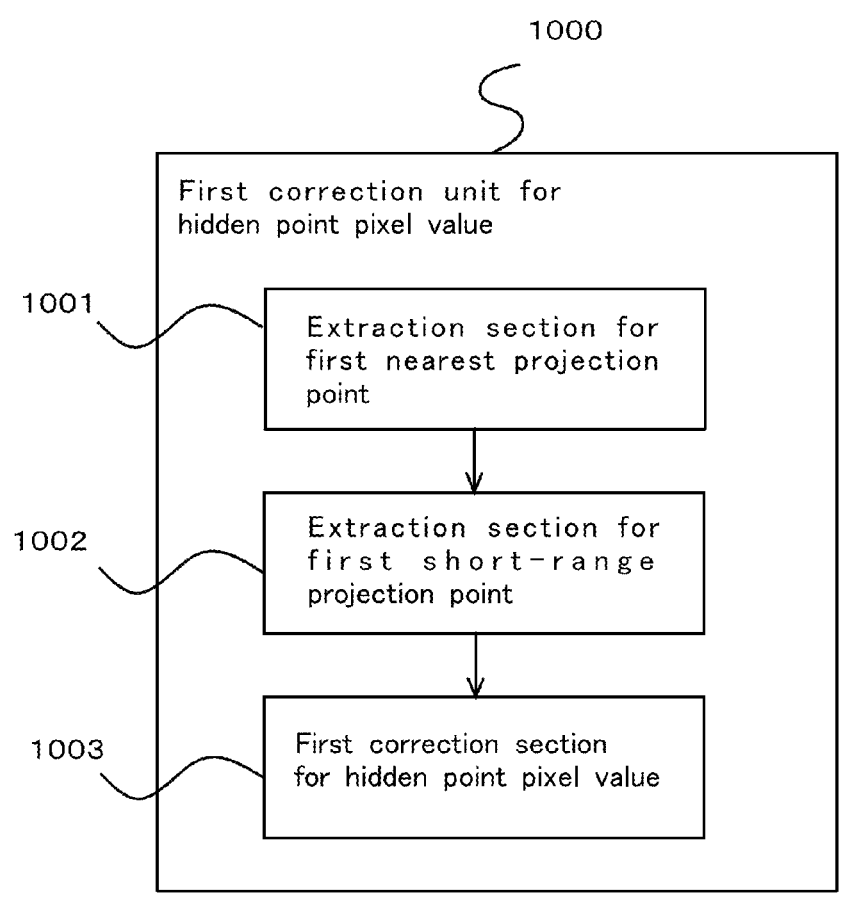
FIG. 10 is a diagram showing a configuration of a first correction unit for hidden point pixel value of a second embodiment.
Figure 11:
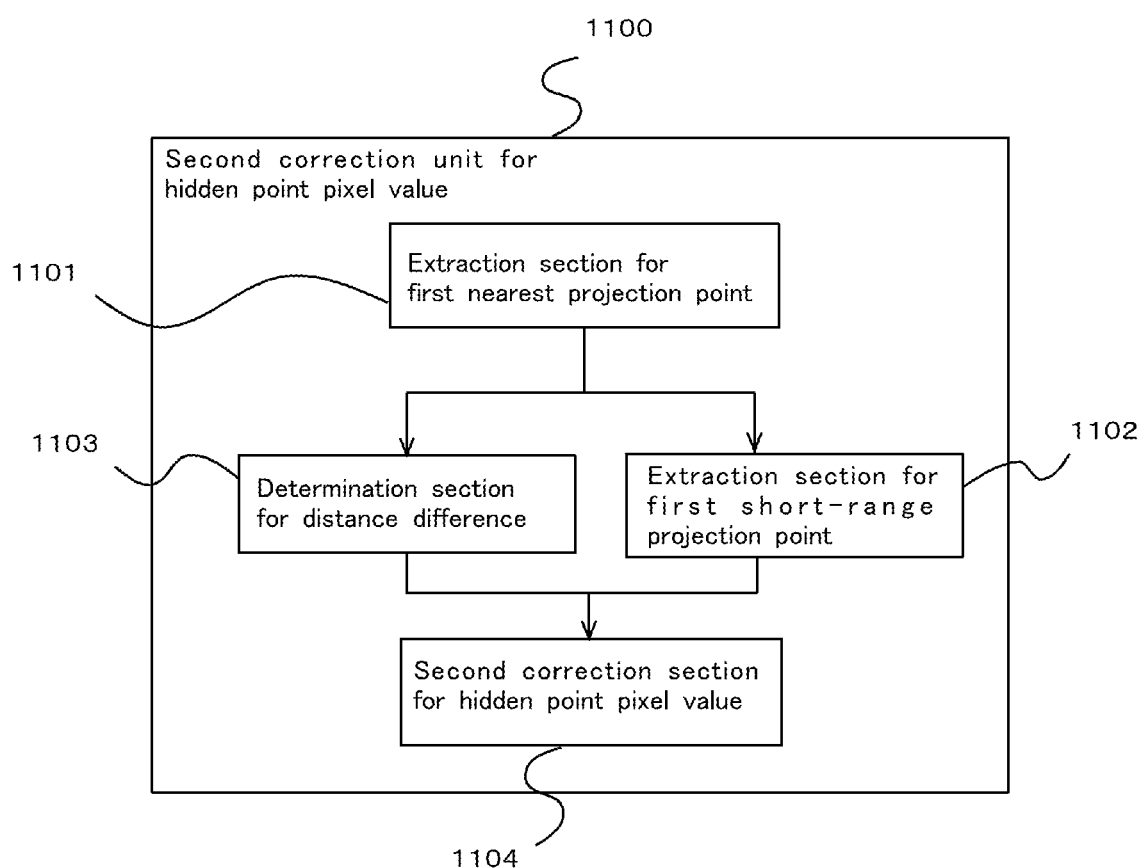
FIG. 11 is a diagram showing a configuration of a second correction unit for hidden point pixel value of the second embodiment.

A configuration of the correction apparatus for other viewpoint closed surface pixel value of the second embodiment is basically the same as that of the first embodiment. Moreover, as shown in FIG. 10, the 'first correction unit for hidden point pixel value' 1000 further comprises an 'extraction section for first nearest projection point' 1001, an 'extraction section for first short-range projection point' 1002, and a 'first correction section for hidden point pixel value' 1003. Moreover, as shown in FIG. 11, the 'second correction unit for hidden point pixel value' 1100 further comprises an 'extraction section for first nearest projection point' 1101, an 'extraction section for first short-range projection point' 1102, a 'determination section for distance difference' 1103, and a 'second correction section for hidden point pixel value' 1104.

The 'extraction section for first nearest projection point' has a function of extracting a first nearest projection point from a first marked point cloud, where the first nearest projection point is a projection point for a measurement point with shortest distance to the other viewpoint, and the first marked point cloud is a group of projection points neighboring the projection point on the other viewpoint closed surface for the hidden point extracted by the extraction unit for hidden point.

Figure 12:
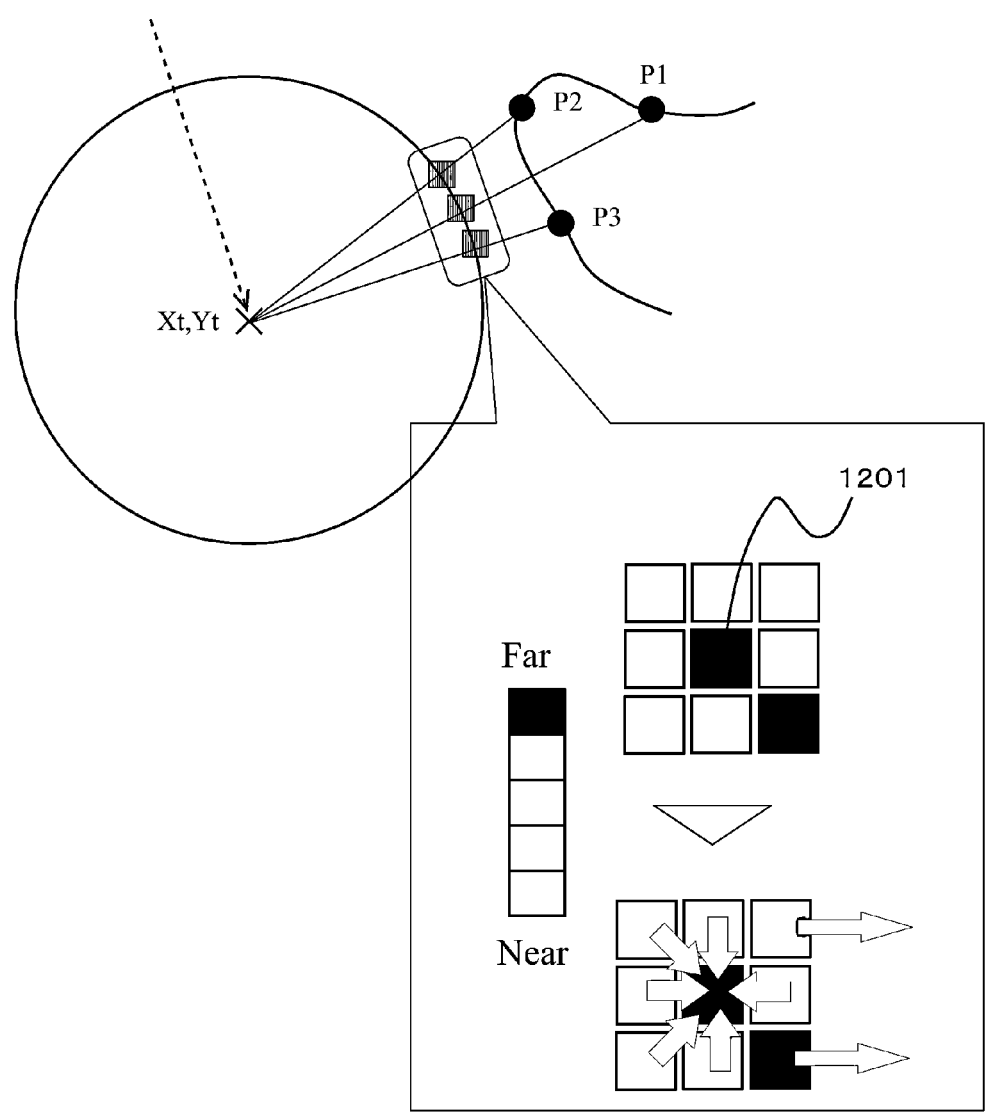
FIG. 12 is a diagram showing an outline of an extraction section for first nearest projection point.

FIG. 12 is a diagram showing an outline of an extraction section for first nearest projection point. In the case of FIG. 12, 3×3 pixels as a neighboring area on the other viewpoint closed surface centering around the projection point 1201 for the hidden point are extracted. Here, a projection point for a measurement point with shortest distance to the other viewpoint (first nearest projection point) is a projection point neighboring on the right side of the projection point for the hidden point, and the extraction section for first nearest projection point extracts the projection point. Note that the projection point may not be single, and a plurality of projection points may be extracted when the distances to the other viewpoints are the same.

The 'extraction section for first short-range projection point' has a function of extracting a first short-range projection point from the first marked point cloud, where the first short-range projection point is a projection point for a measurement point within a predetermined range from the measurement point projected onto the first nearest projection point.

For example, when the distance from the marked measurement point to the other viewpoint is smaller than the value acquired by adding a predetermined threshold value (e.g. 2 m) to the distance from the measurement point projected onto the first nearest projection point to the other viewpoint, the marked measurement point may be set as the first short-range projection point. Moreover, when a ratio between the distance from the marked measurement point to the other viewpoint and the distance from the measurement point projected onto the first nearest projection point to the other viewpoint is less than or equal to a predetermined value, the marked measurement point may be set as the first short-range projection point. Note that various methods for measuring the distances of the marked measurement point and the measurement point projected onto the first nearest projection point may be utilized, and is not limited to the above example.

In the case of FIG. 12, the projection points for the measurement point (first short-range projection point), which are located within a predetermined range from the measurement point projected onto the first nearest projection point, are all projection points in the left column and top and bottom projection points in the central column, and top and bottom projection points in the right column are the measurement, which are not located within the predetermined range. In this case, the extraction section for first short-range projection point extracts the all projection points in the left column and the top and bottom projection points in the central column.

The 'first correction section for hidden point pixel value' has a function of correcting the pixel value of the projection point on the other viewpoint closed surface for the hidden point by utilizing the pixel value of the first nearest projection point and the first short-range projection point.

As the method for correcting the pixel value of the projection point on the other viewpoint closed surface for the hidden point by utilizing the pixel value of the first nearest projection point and the first short-range projection point, for example, an average value of these pixel values is calculated, thereby setting the average value as the pixel value of the hidden point. Moreover, it is possible to weight the pixel values of the first nearest projection point and the first short-range projection point according to the interval with the projection points on the other viewpoint closed surface for the hidden point, thereby calculating the pixel value of the projection point for the hidden point. Specifically, as the interval between the marked projection point an the projection point for the hidden point gets shorter, contribution to the projection point may be set to be higher.

The 'determination section for distance difference' has a function of determining whether a difference between distance from the hidden point to the other viewpoint and the distance from the measurement point projected onto the first nearest projection point to the other viewpoint is more than or equal to a predetermined value.

The 'second correction section for hidden point pixel value' has a function of correcting the pixel value of the projection point on the other viewpoint closed surface for the hidden point using the pixel value of the nearest projection point and the first short-range projection point, when the determination by the determination section for distance difference indicates that the distance difference is more than or equal to the predetermined value.

Figure 13:
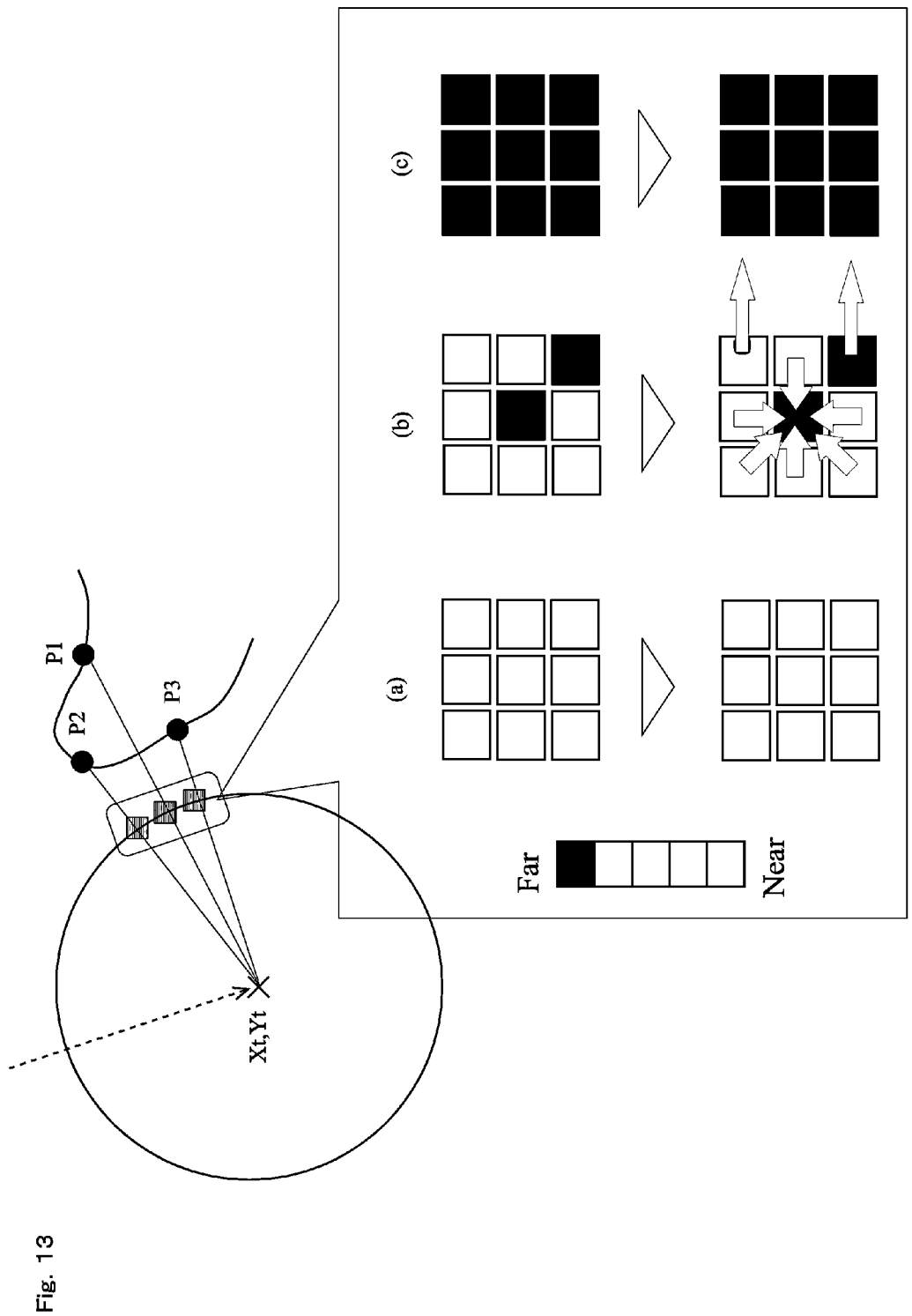
FIG. 13 is a diagram showing an outline of a second correction section for hidden point pixel value.

FIG. 13 is a diagram showing an outline of a second correction section for hidden point pixel value. In the cases of FIGS. 13(a) and (c), since the difference between distance from the hidden point to the other viewpoint and the distance from the measurement point projected onto the first nearest projection point to the other viewpoint is less than the predetermined value, the pixel value of the projection point on the other viewpoint closed surface is not corrected, and the pixel value of the hidden point is not changed. In the cases of FIG. 13(b), since the difference between distance from the hidden point to the other viewpoint and the distance from the measurement point projected onto the first nearest projection point to the other viewpoint is more than or equal to the predetermined value, the pixel value of the projection point on the other viewpoint closed surface for the hidden point is corrected by utilizing the pixel value of the nearest projection point and the first short-range projection point. Therefore, when the distances from the other viewpoints are almost the same, it is expected that the pixel value of the projection point on the other viewpoint closed surface for the hidden point and the pixel value of the neighboring projection point are also the same, so that the following correction processes are omitted.

<Concrete Configuration of Second Embodiment>

The hardware configuration of the correction apparatus for other viewpoint closed surface pixel value of the second embodiment is basically the same as that of the correction apparatus for other viewpoint closed surface pixel value of the first embodiment as described with reference to FIG. 8. Hereinafter, description of the correction process for hidden point pixel value of the correction apparatus for other viewpoint closed surface pixel value of the second embodiment will be provided.

The CPU extracts the first nearest projection point from a first marked point cloud, where the first nearest projection point is a projection point for a measurement point with shortest distance to the other viewpoint, and the first marked point cloud is a group of projection points neighboring the projection point on the other viewpoint closed surface for the hidden point extracted by the extraction unit for hidden point (extraction process for first nearest projection point).

Specifically, distances from the respective measurement points projected onto n×n pixels (e.g. 3×3 pixels) centering around the projection point on the other viewpoint closed surface for the hidden point to the other viewpoint are calculated, and the ID of the projection point for the measurement point, where the distance has the minimum value, and the distance value are correlated, thereby being stored in the RAM as the information of the first nearest projection point.

Subsequently, the CPU extracts the first short-range projection point from the first marked point cloud, where the first short-range projection point is a projection point for a measurement point within a predetermined range from the measurement point projected onto the first nearest projection point (extraction process for first short-range projection point).

Specifically, it is determined whether the difference between distance from the respective measurement points to the other viewpoint and the distance from the measurement point projected onto the first nearest projection point to the other viewpoint is within a predetermined range, the IDs of the projection points for the measurement points, where the difference is within the predetermined range, and the distance value are correlated, thereby being stored in the RAM as the information of the first short-range projection point.

Subsequently, the CPU corrects the pixel value of the projection point on the other viewpoint closed surface for the hidden point by utilizing the pixel value of the first nearest projection point and the first short-range projection point (first correction process for hidden point pixel value).

Specifically, an average value of the pixel value of the first nearest projection point and the first short-range projection point is calculated, and the pixel value of the hidden point is replaced with the average value.

Moreover, as the substitute for the first correction process for hidden point pixel value, the second correction process for hidden point pixel value may be carried out.

The CPU determines whether a difference between distance from the hidden point to the other viewpoint and the distance from the measurement point projected onto the first nearest projection point to the other viewpoint is more than or equal to the predetermined value (determination process for distance difference).

Specifically, the difference between distance from the hidden point to the other viewpoint and the distance from the measurement point projected onto the first nearest projection point to the other viewpoint is calculated, thereby determining whether the difference is more than or equal to the predetermined value. The determination result is stored in the RAM.

Subsequently, the CPU corrects the pixel value of the projection point on the other viewpoint closed surface for the hidden point using the pixel value of the nearest projection point and the first short-range projection point, when the determination by the determination section for distance difference indicates that the distance difference is more than or equal to the predetermined value (correction process for hidden point pixel value).

Specifically, when the determination by the determination process for distance difference indicates that the distance difference is more than or equal to the predetermined value, the average value of the pixel value of the first nearest projection point and the first short-range projection point is calculated, and the pixel value of the hidden point is replaced with the average value.

<Processing Flow of Second Embodiment>

Figure 14:
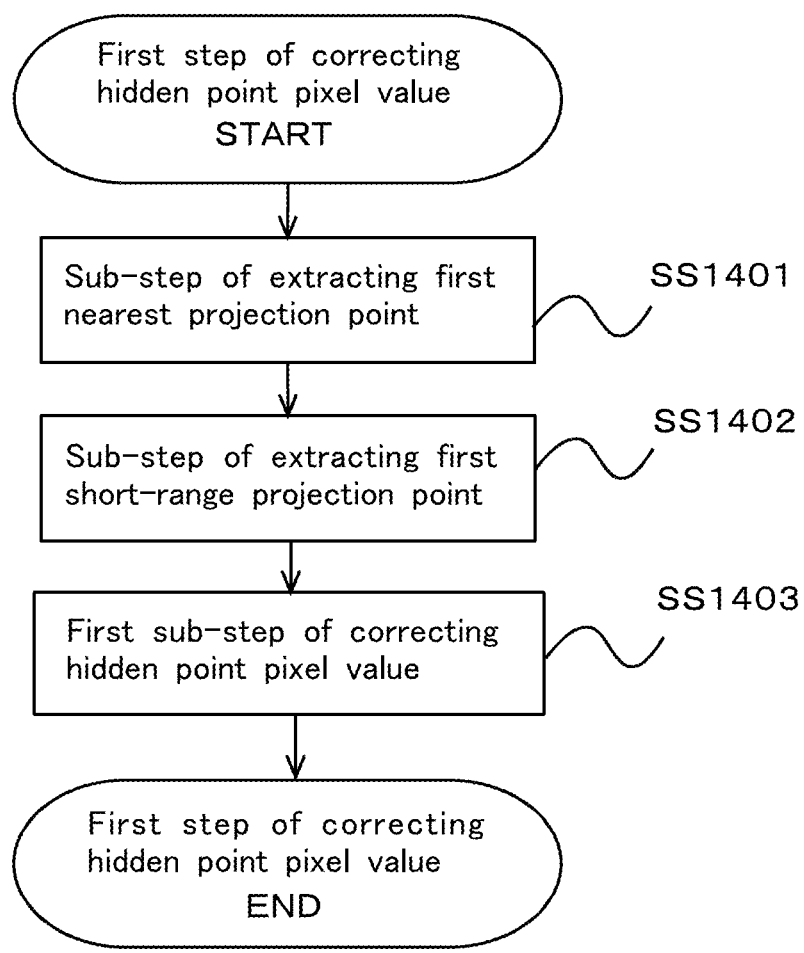
FIG. 14 is a flowchart of a first step of correcting hidden point pixel value.

A flowchart of the correction method for other viewpoint closed surface pixel value of the second embodiment is basically the same as that of the correction method for other viewpoint closed surface pixel value of the first embodiment as described with reference to FIG. 9. As shown in FIG. 14, the first step of correcting hidden point pixel value of the second embodiment comprises the following sub-steps. At the outset, in a sub-step SS1401, the first nearest projection point is extracted from the first marked point cloud, where the first nearest projection point is a projection point for a measurement point with shortest distance to the other viewpoint, and the first marked point cloud is a group of projection points neighboring the projection point on the other viewpoint closed surface for the hidden point extracted by the extraction unit for hidden point (sub-step of extracting first nearest projection point). Subsequently, in a sub-step SS1402, the first short-range projection point is extracted from the first marked point cloud, where the first short-range projection point is a projection point for a measurement point within a predetermined range from the measurement point projected onto the first nearest projection point (sub-step of extracting first short-range projection point). Subsequently, in a sub-step SS1403, the pixel value of the projection point on the other viewpoint closed surface for the hidden point is corrected by utilizing the pixel value of the first nearest projection point and the first short-range projection point (first sub-step of correcting hidden point pixel value).

Figure 15:
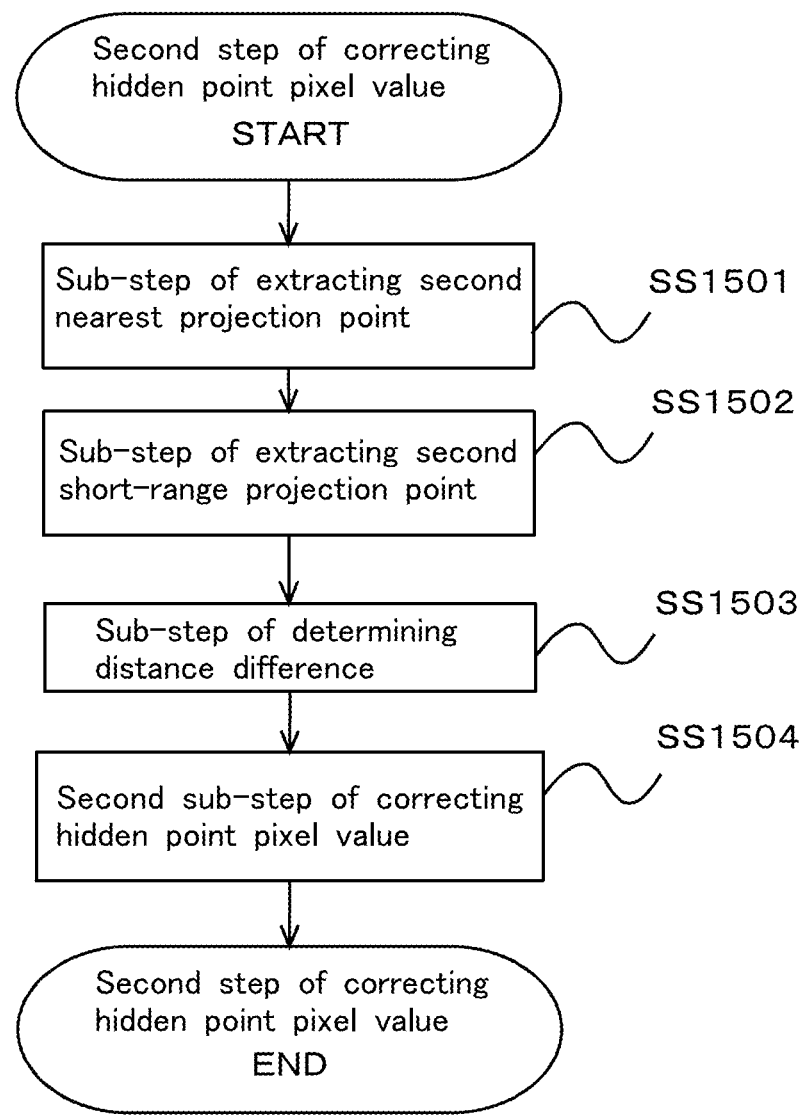
FIG. 15 is a flowchart of a second step of correcting hidden point pixel value.

Moreover, as shown in FIG. 15, the second step of correcting hidden point pixel value of the second embodiment comprises the following sub-steps. At the outset, in a sub-step SS1501, the first nearest projection point is extracted from the first marked point cloud, where the first nearest projection point is a projection point for a measurement point with shortest distance to the other viewpoint, and the first marked point cloud is a group of projection points neighboring the projection point on the other viewpoint closed surface for the hidden point extracted by the extraction unit for hidden point (sub-step of extracting first nearest projection point). Subsequently, in a sub-step SS1502, the first short-range projection point is extracted from the first marked point cloud, where the first short-range projection point is a projection point for a measurement point within a predetermined range from the measurement point projected onto the first nearest projection point (sub-step of extracting first short-range projection point). Subsequently, in a sub-step SS1503, it is determined whether the difference between distance from the hidden point to the other viewpoint and the distance from the measurement point projected onto the first nearest projection point to the other viewpoint is more than or equal to the predetermined value (sub-step of determining distance difference). Subsequently, in a sub-step SS1504, the pixel value of the projection point on the other viewpoint closed surface for the hidden point is corrected using the pixel value of the nearest projection point and the first short-range projection point, when the determination by the sub-step of determining distance difference indicates that the distance difference is more than or equal to the predetermined value (second sub-step of correcting hidden point pixel value).

<Brief Description of Effects of Second Embodiment>

According to the correction apparatus for other viewpoint closed surface pixel value of the second embodiment, it is possible to generate the virtual closed surface image with high quality centering around the arbitrary viewpoint on the basis of the real spatial positional information and the pixel value information for a group of measurement points acquired by centering around the single viewpoint.

<<Third Embodiment>>

<Outline of Third Embodiment>

A correction apparatus for other viewpoint closed surface pixel value of a third embodiment extracts a data missing point on the basis of a relative positional relationship between a projection point on the other viewpoint closed surface for the arbitrary measurement point and a projection point neighboring the projection point on the other viewpoint closed surface for the arbitrary measurement point, the data missing point being a projection point to be located on the other viewpoint closed surface when acquiring the point cloud data by centering around the other viewpoint, but having no data; and interpolates a pixel value of the data missing point extracted by the extraction unit for data missing point on the basis of the distance from the measurement point projected onto the neighboring projection point on the other viewpoint closed surface to another viewpoint position and the pixel value of the measurement point. According this feature, it is possible to generate the virtual closed surface image with high quality centering around the arbitrary viewpoint on the basis of the real spatial positional information and the pixel value information for a group of measurement points acquired by centering around the single viewpoint.

<Configuration of Third Embodiment>

Figure 16:
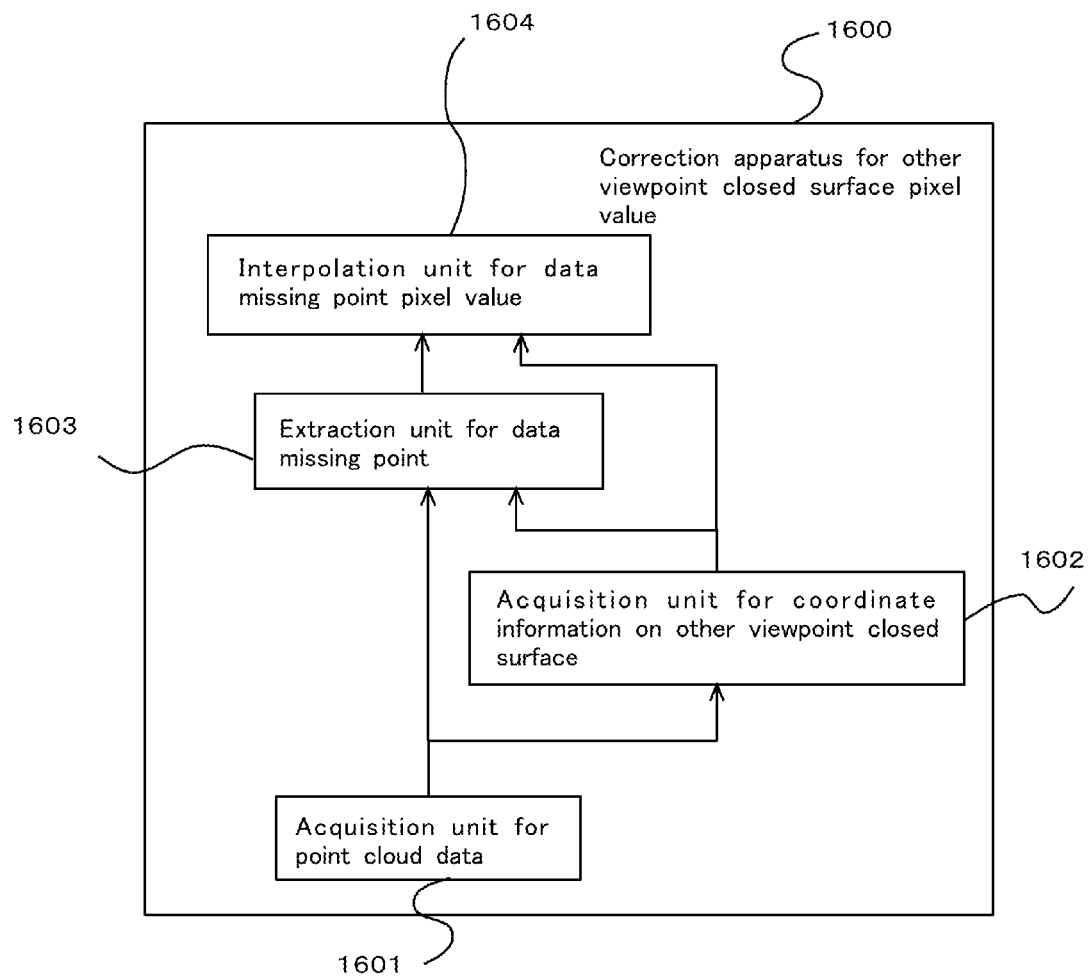
FIG. 16 is a diagram showing a configuration of a correction apparatus for other viewpoint closed surface pixel value of a third embodiment.

FIG. 16 is a diagram showing a configuration of a correction apparatus for other viewpoint closed surface pixel value of a third embodiment. As shown in FIG. 16, a 'correction apparatus for other viewpoint closed surface pixel value' 1600 of the third embodiment comprises an 'acquisition unit for point cloud data' 1601, an 'acquisition unit for coordinate information on other viewpoint closed surface' 1602, an 'extraction unit for data missing point' 1603, and an 'interpolation unit for data missing point pixel value' 1604. Hereinafter, descriptions of the 'extraction unit for data missing point', and the 'interpolation unit for data missing point pixel value', which are differences from the first embodiment, will be provided.

The 'extraction unit for data missing point' has a function of extracting a data missing point, which is a projection point to be located on the other viewpoint closed surface when acquiring the point cloud data by centering around the other viewpoint, but having no data, on the basis of a relative positional relationship between a projection point on the other viewpoint closed surface for the arbitrary measurement point and a projection point neighboring the projection point on the other viewpoint closed surface for the arbitrary measurement point.

The data of the group of measurement points is measured by centering around the single viewpoint, so that it is possible to regularly project without space on the single viewpoint closed surface. Meanwhile, on the other viewpoint closed surface, since the data of the group of measurement points measured by centering around the single viewpoint, not the other viewpoint, is used, the data missing point being a projection point to be located on the other viewpoint closed surface when acquiring the point cloud data by centering around the other viewpoint, but having no data, possibly occurs.

Figure 17:
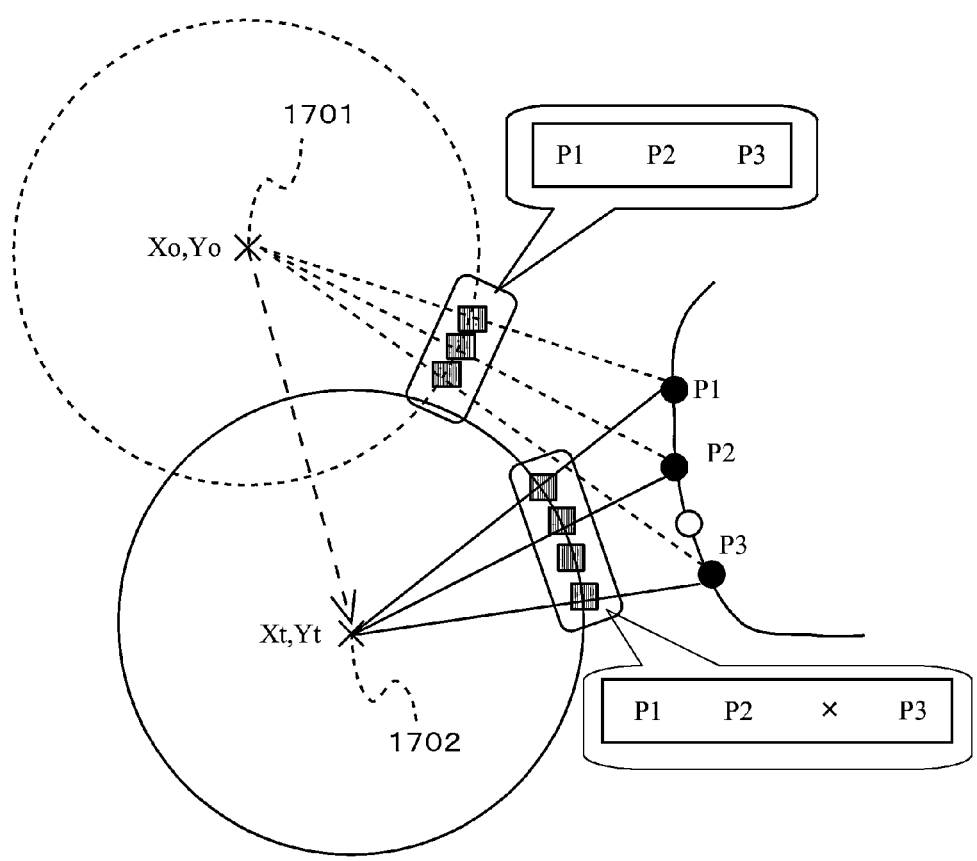
FIG. 17 is a diagram exemplifying extraction of data missing point by an extraction unit for data missing point.

FIG. 17 is a diagram exemplifying extraction of data missing point by an extraction unit for data missing point. When viewing from the single viewpoint 1701 $(X_0, Y_0)$ to the measurement points P1, P2 and P3, the projection points thereof on the single viewpoint closed surface are located in order of P1, P2, and P3 clockwise (rightward in horizontal direction), and meanwhile, when viewing from other viewpoint 1702 $(X_t, Y_t)$ to the measurement points P1, P2 and P3, the data missing point occurs between the projection points for P2 and P3 on the other viewpoint closed surface.

Specifically, on the basis of the relative positional relationship between a projection point on the other viewpoint closed surface for the arbitrary measurement point (P2) and the neighboring projection point (P3), it can be determined that the data missing point being a projection point to be located on the other viewpoint closed surface when acquiring the point cloud data by centering around the other viewpoint, but having no data, possibly occurs.

The 'interpolation unit for data missing point pixel value' has a function of interpolating a pixel value of the data missing point extracted by the extraction unit for data missing point on the basis of the distance from the measurement point projected onto the neighboring projection point on the other viewpoint closed surface to another viewpoint position and the pixel value of the measurement point.

Since the data missing point extracted by the extraction unit for data missing point is a projection point to be located on the other viewpoint closed surface when acquiring the point cloud data by centering around the other viewpoint, the data missing point is to be replaced with the value estimated as the pixel value of the measurement point projected onto the projection point.

Therefore, the interpolation unit for data missing point pixel value calculates the pixel value of the projection point for the measurement point to be projected onto the other viewpoint closed surface on the basis of the distance from the measurement points projected onto the neighboring projection points of the data missing point to the other viewpoints. The concrete process is the same as that of the first correction unit for hidden point pixel value.

In the configuration of the correction apparatus for other viewpoint closed surface pixel value of the third embodiment, the acquisition unit for coordinate information on single viewpoint closed surface, the extraction unit for hidden point, and the first correction unit for hidden point pixel value of the first embodiment are replaced with the extraction unit for data missing point and the interpolation unit for data missing point pixel value. Moreover, the correction apparatus for other viewpoint closed surface pixel value of the third embodiment may comprise all of these components. In this case, it is possible to generate the other viewpoint closed surface image with higher quality.

<Concrete Configuration of Third Embodiment>

The hardware configuration of the correction apparatus for other viewpoint closed surface pixel value of the third embodiment is basically the same as that of the correction apparatus for other viewpoint closed surface pixel value of the first embodiment as described with reference to FIG. 8. Hereinafter, descriptions of the extraction process for data missing point and the 'interpolation process for data missing point pixel value of the correction apparatus for other viewpoint closed surface pixel value of the third embodiment will be provided.

The CPU extracts the data missing point being a projection point to be located on the other viewpoint closed surface when acquiring the point cloud data by centering around the other viewpoint, but having no data, on the basis of a relative positional relationship between a projection point on the other viewpoint closed surface for the arbitrary measurement point and a projection point neighboring the projection point on the other viewpoint closed surface for the arbitrary measurement point (extraction process for data missing point).

Specifically, the data interval between the projection point on the other viewpoint closed surface for the marked measurement point and the neighboring projection points in vertical and horizontal direction are acquired, thereby extracting the data missing point on the other viewpoint closed surface.

Subsequently, the CPU interpolates the pixel value of the data missing point extracted by the extraction unit for data missing point on the basis of the distance from the measurement point projected onto the neighboring projection point on the other viewpoint closed surface to another viewpoint position and the pixel value of the measurement point (interpolation process for data missing point pixel value).

Specifically, the distance between the measurement points projected onto the neighboring projection points of the data missing point on the other viewpoint closed surface to the other viewpoints is calculated. Here, the measurement points projected onto neighboring projection point are divided into a group having distance smaller than a predetermined threshold, and a group having distance greater than a predetermined threshold, and an average value of pixel values of the group having distance smaller than a predetermined threshold is calculated. Subsequently, the pixel value of the data missing point is replaced with the average value.

<Processing Flow of Third Embodiment>

Figure 18:
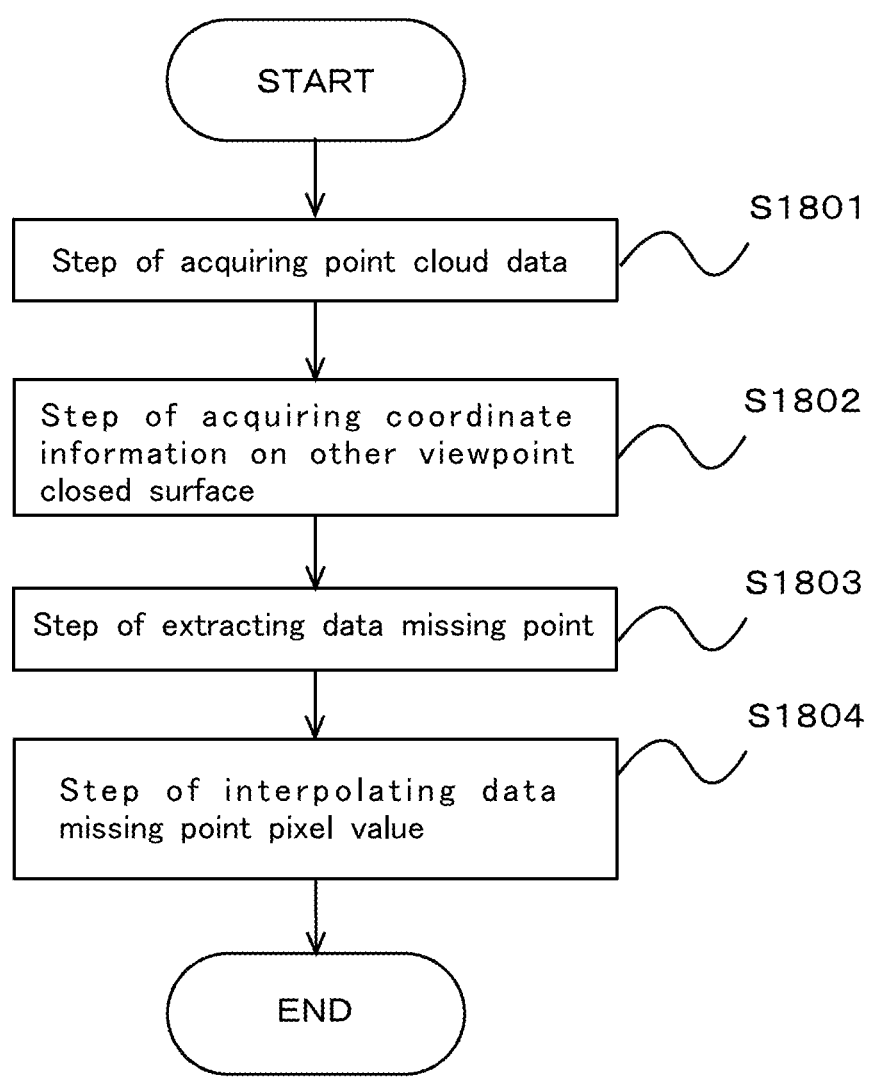
FIG. 18 is a flowchart of the correction method for other viewpoint closed surface pixel value of the third embodiment.

FIG. 18 is a flowchart of the correction method for other viewpoint closed surface pixel value of the third embodiment. The process of FIG. 18 includes the following steps. At the outset, in a step S1801, the real spatial positional information for a group of measurement points projectable onto a single viewpoint closed surface being a virtual closed surface centering around a single viewpoint, and point cloud data being pixel value information for real spatial positional information are acquired (step of acquiring point cloud data). Subsequently, in a step S1802, the coordinate information on the single viewpoint closed surface, which is coordinate information on the closed surface for a group of projection points acquired by projecting the group of measurement points on the other viewpoint closed surface, is acquired (step of acquiring coordinate information on other viewpoint closed surface). Subsequently, in a step S1803, the data missing point being a projection point to be located on the other viewpoint closed surface when acquiring the point cloud data by centering around the other viewpoint, but having no data, is extracted on the basis of a relative positional relationship between a projection point on the other viewpoint closed surface for the arbitrary measurement point and a projection point neighboring the projection point on the other viewpoint closed surface for the arbitrary measurement point (step of extracting data missing point). Subsequently, in a step S1804, the pixel value of the data missing point extracted by the extraction unit for data missing point is interpolated on the basis of the distance from the measurement point projected onto the neighboring projection point on the other viewpoint closed surface to another viewpoint position and the pixel value of the measurement point (step of interpolating data missing point pixel value).

<Brief Description of Effects of Third Embodiment>

According to the correction apparatus for other viewpoint closed surface pixel value of the third embodiment, it is possible to generate the virtual closed surface image with high quality centering around the arbitrary viewpoint on the basis of the real spatial positional information and the pixel value information for a group of measurement points acquired by centering around the single viewpoint.

<<Fourth Embodiment>>
<Outline of Fourth Embodiment>

A correction apparatus for other viewpoint closed surface pixel value of a fourth embodiment is basically the same as that of the third embodiment, and when correcting the pixel value of the data missing point, extracts a projection point for a measurement point with shortest distance to the other viewpoint (second nearest projection point) from a group of projection points on the other viewpoint closed surface neighboring the extracted data missing point (second marked point cloud), extracts a projection point for a measurement point within a predetermined range from the measurement point for the second nearest projection point (second short-range projection point) from the second marked point cloud, and interpolates the pixel value of the data missing point by utilizing the pixel values of the second nearest projection point and the second short-range projection point. According this feature, it is possible to generate the virtual closed surface image with high quality centering around the arbitrary viewpoint on the basis of the real spatial positional information and the pixel value information for a group of measurement points acquired by centering around the single viewpoint.

<Configuration of Fourth Embodiment>

Figure 19:
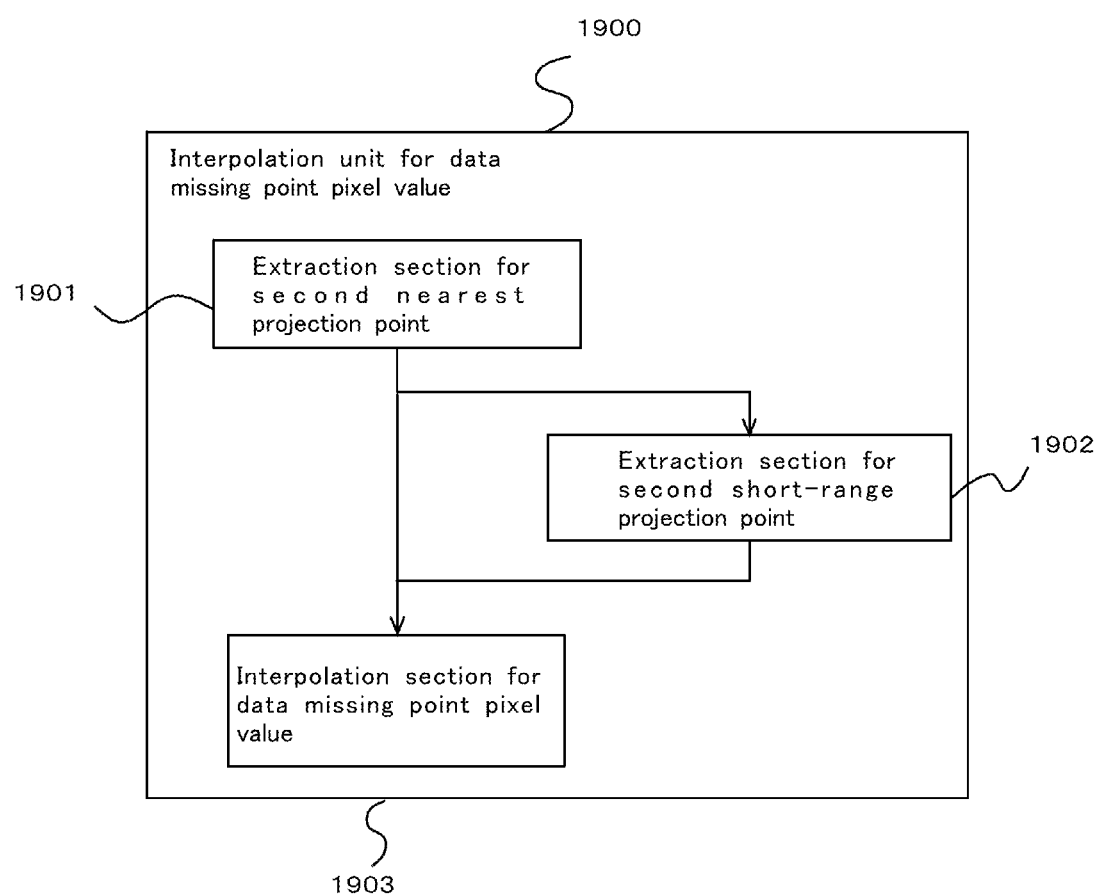
FIG. 19 is a diagram showing a configuration of an interpolation unit for data missing point pixel value of a fourth embodiment.

A configuration of the correction apparatus for other viewpoint closed surface pixel value of the fourth embodiment is basically the same as that of the third embodiment as described with reference to FIG. 16. Moreover, as shown in FIG. 19, the 'interpolation unit for data missing point pixel value' 1900 of the correction apparatus for other viewpoint closed surface pixel value of the fourth embodiment further comprises an 'extraction section for second nearest projection point' 1901, an 'extraction section for second short-range projection point' 1902, and an 'interpolation section for data missing point pixel value' 1903. Hereinafter, descriptions of the 'extraction section for second nearest projection point', the 'extraction section for second short-range projection point', and the 'interpolation section for data missing point pixel value' which are differences from the third embodiment, will be provided.

The 'extraction section for second nearest projection point' has a function of extracting the second nearest projection point from a second marked point cloud, where the second nearest projection point is a projection point for a measurement point with shortest distance to the other viewpoint, the second marked point cloud is a group of projection points on the other viewpoint closed surface neighboring the data missing point extracted by the extraction unit for data missing point. Note that the second nearest projection point may not be single, and a plurality of second nearest projection points may be extracted when the distances to the other viewpoints are the same.

The 'extraction section for second short-range projection point' has a function of extracting a second short-range projection point from the second marked point cloud, where the second short-range projection point is a projection point for a measurement point within a predetermined range from the measurement point for the second nearest projection point.

For example, when the distance from the marked measurement point to the other viewpoint is smaller than the value acquired by adding a predetermined threshold value (e.g. 2 m) to the distance from the measurement point projected onto the first nearest projection point to the other viewpoint, the marked measurement point may be set as the second short-range projection point. Moreover, when a ratio between the distance from the marked measurement point to the other viewpoint and the distance from the measurement point projected onto the second nearest projection point to the other viewpoint is less than or equal to a predetermined value, the marked measurement point may be set as the second short-range projection point. Note that various methods for measuring the distances of the marked measurement point and the measurement point projected onto the second nearest projection point may be utilized, and is not limited to the above example.

The 'interpolation section for data missing point pixel value' has a function of interpolating the pixel value of the data missing point by utilizing the pixel values of the second nearest projection point and the second short-range projection point.

As the method for correcting the pixel value of the data missing point by utilizing the pixel value of the second nearest projection point and the second short-range projection point, for example, an average value of these pixel values is calculated, thereby setting the average value as the pixel value of the data missing point. Moreover, it is possible to weight the pixel values of the second nearest projection point and the second short-range projection point according to the interval with the data missing point on the other viewpoint closed surface, thereby calculating the pixel value of the projection point for the data missing point. Specifically, as the interval between the marked projection point and the data missing point gets shorter, contribution by the projection point to the pixel value of the data missing point may be set to be higher.

<Concrete Configuration of Fourth Embodiment>

The hardware configuration of the correction apparatus for other viewpoint closed surface pixel value of the fourth embodiment is basically the same as that of the correction apparatus for other viewpoint closed surface pixel value of the first embodiment as described with reference to FIG. 8. Hereinafter, description of the interpolation process for data missing point pixel value will be provided.

The CPU extracts the second nearest projection point from the second marked point cloud, where the second nearest projection point is a projection point for a measurement point with shortest distance to the other viewpoint, and the second marked point cloud is a group of projection points neighboring the data missing point on the other viewpoint closed surface (extraction process for second nearest projection point).

Specifically, distances from the respective measurement points projected onto projection points in n×n pixels (e.g. 3×3 pixels) centering around the data missing point to the other viewpoint are calculated, and the ID of the projection point for the measurement point, where the distance has the minimum value, and the distance value are correlated, thereby being stored in the RAM as the information of the second nearest projection point.

Subsequently, the CPU extracts the second short-range projection point from the second marked point cloud, where the second short-range projection point is a projection point for a measurement point within a predetermined range from the measurement point projected onto the second nearest projection point (extraction process for second short-range projection point).

Specifically, it is determined whether the difference between distance from the respective measurement points to the other viewpoint and the distance from the measurement point projected onto the second nearest projection point to the other viewpoint is within a predetermined range, the IDs of the projection points for the measurement points, where the difference is within the predetermined range, and the distance value are correlated, thereby being stored in the RAM as the information of the second short-range projection point.

Subsequently, the CPU interpolates the pixel value of the data missing point by utilizing the pixel values of the second nearest projection point and the second short-range projection point (interpolation process for data missing point pixel value).

Specifically, an average value of the pixel values of the second nearest projection point and the second short-range projection point is calculated, thereby setting the average value as the pixel value of the data missing point.

<Processing Flow of Fourth Embodiment>

Figure 20:
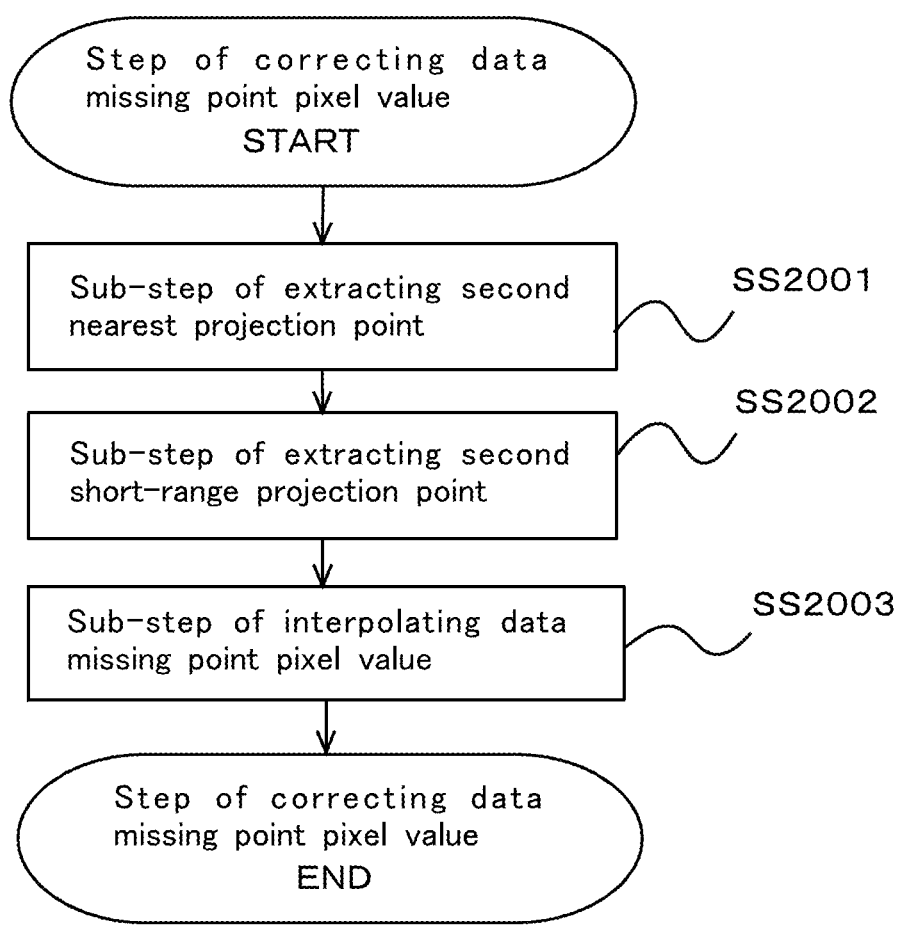
FIG. 20 is a flowchart of a step of interpolating data missing point pixel value.

A flowchart of the correction method for other viewpoint closed surface pixel value of the fourth embodiment is basically the same as that of the correction method for other viewpoint closed surface pixel value of the third embodiment as described with reference to FIG. 18. As shown in FIG. 20, the step of interpolating data missing point pixel value of the correction method for other viewpoint closed surface pixel value of the fourth embodiment comprises the following sub-steps. At the outset, in a sub-step SS2001, the second nearest projection point, which is a projection point for a measurement point with shortest distance to the other viewpoint, from the second marked point cloud, which is a group of projection points on the other viewpoint closed surface neighboring the data missing point extracted by the step of extracting data missing point (sub-step of extracting second nearest projection point). Subsequently, in a sub-step SS2002, the second short-range projection point, which is a projection point for a measurement point within a predetermined range from the measurement point projected onto the second nearest projection point, is extracted from the second marked point cloud (sub-step of extracting second short-range projection point). Subsequently, in a sub-step SS2003, the pixel value of the data missing point is interpolated by utilizing the pixel values of the second nearest projection point and the second short-range projection point (sub-step of interpolating data missing point pixel value).

<Brief Description of Effects of Fourth Embodiment>

According to the correction apparatus for other viewpoint closed surface pixel value of the fourth embodiment, it is possible to generate the virtual closed surface image with high quality centering around the arbitrary viewpoint on the basis of the real spatial positional information and the pixel value information for a group of measurement points acquired by centering around the single viewpoint.

<<Fifth Embodiment>>
<Outline of Fifth Embodiment>

A correction apparatus for other viewpoint closed surface pixel value of a fifth embodiment is basically the same as that of the first to fourth embodiments, and acquires the point cloud data for a plurality of viewpoints, extracts data of a mirror-image point, which is a measurement point located at the mirror-image position of a substantial object through a reflection surface, and removes the data of the mirror-image point from the point cloud data for the single viewpoint. According this feature, it is possible to remove the mirror-image point, which does not exist in reality, thereby generating the virtual closed surface image with high quality.

<Configuration of Fifth Embodiment>

Figure 21:
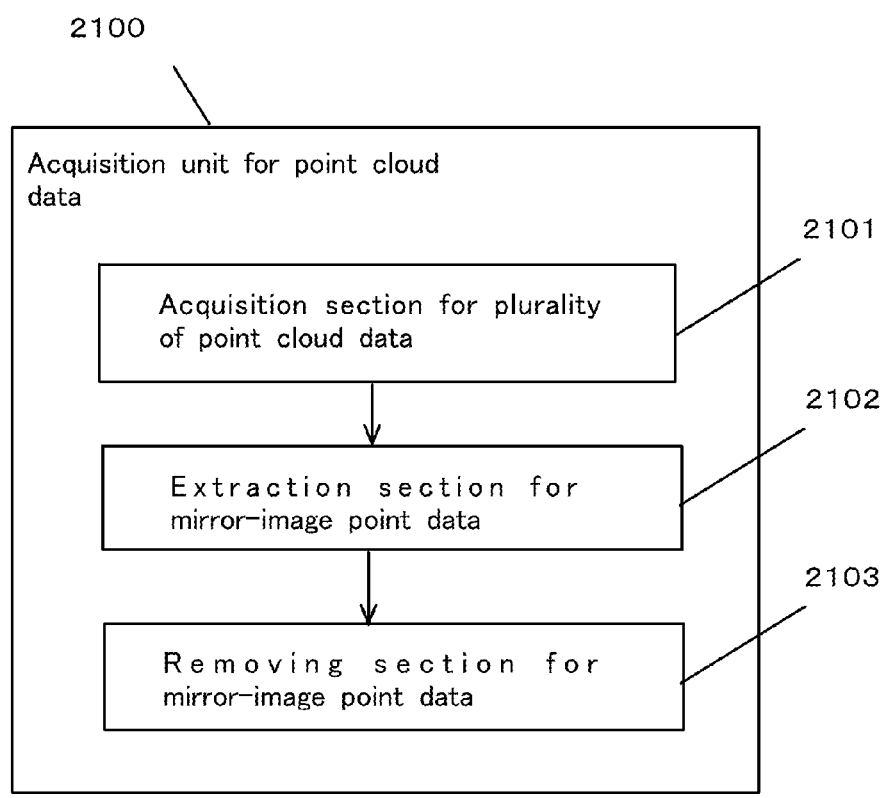
FIG. 21 is a diagram showing a configuration of a correction apparatus for other viewpoint closed surface pixel value of a fifth embodiment.

A configuration of the correction apparatus for other viewpoint closed surface pixel value of the fifth embodiment is basically the same as that of the first embodiment as described with reference to FIG. 1. Moreover, as shown in FIG. 21, the 'acquisition unit for point cloud data' 2100 of the correction apparatus for other viewpoint closed surface pixel value of the fifth embodiment further comprises an 'acquisition section for plurality of point cloud data' 2101, an 'extraction section for mirror-image point data' 2102, and a 'removing section for mirror-image point data' 2103. Hereinafter, descriptions of the 'acquisition section for plurality of point cloud data', the 'extraction section for mirror-image point data', and the 'removing section for mirror-image point data', which are differences from the first embodiment, will be provided.

The 'acquisition section for plurality of point cloud data' has a function of acquiring the point cloud data for a plurality of viewpoints, including the single viewpoint and excluding the other viewpoint. Here, if the point cloud data for the other viewpoint is acquired, the point cloud data for the other viewpoint is projected on the other viewpoint closed surface, thereby generating the other viewpoint closed surface coordinate information with high quality of image.

The above point cloud data for the plurality of viewpoints can be acquired by utilizing a laser scanner capable of acquiring the point cloud data on a surface within the scope of 360 degrees in a horizontal direction. As described in the first embodiment, the scanner can acquire a distance from a viewpoint to a measurement point based on a response time of laser reflection, and moreover, can specify the real special positional information with the information of direction of laser emission. Moreover, a configuration where the data acquired by such devices are acquired from storage device capable of storing the data via the network is applicable.

Figure 22:
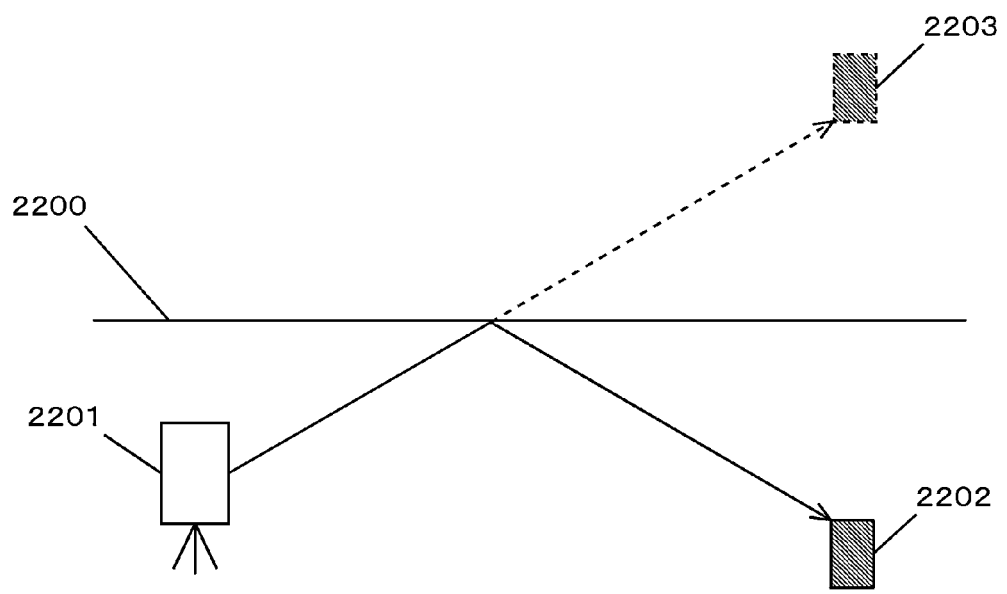
FIG. 22 is a diagram showing a measurement point at a position having a mirror-image relationship with a substantial position through a reflection surface.

The 'extraction section for mirror-image point data' has a function of extracting data of a mirror-image point from the point cloud data for the plurality of viewpoints, the mirror-image point being a measurement point at a mirror-image position of a real position through a reflecting surface. FIG. 22 is a diagram showing a measurement point at a position having a mirror-image relationship with a substantial position through a reflection surface. As shown in FIG. 22, when a 'reflection surface' 2200 exists, a light-path between a 'viewpoint' 2201 of the measurement device and a 'substantial object' 2202 through the 'reflection surface' 2200 is established. Although the distance between the 'viewpoint' 2201 and the 'substantial object' 2202 can be acquired on the basis of the response time of laser reflection etc., it is assumed that the measurement point is located in a direction of laser emission etc. Since a 'mirror-image point' 2203, which is located at the mirror-image position through the 'reflection surface' 2200, is an error data, the mirror-image point is to be removed from the point cloud data for the single viewpoint closed surface.

As a method for removing the mirror-image point from the point cloud data for the single viewpoint closed surface, a process of threshold value by utilizing laser reflection intensity has been known. In this method, as to a measurement point having smaller laser reflection intensity than a threshold value, it is regarded that the light reaches through the reflection surface, so that the data of the measurement point is removed from the point cloud data. However, in this method, there are many cases where the measurement point data is removed even when the light reaches directly from the substantial object without through the reflection surface. Therefore, usable measurement data are substantially removed. Moreover, although a process of threshold value by utilizing 3D CAD exists, this method is usable only when a measurement target is configured by flat surface, and is of narrow application. Moreover, it is possible to manually remove the measurement point assumed to be the mirror-image point. However, this method requires great deal of time.

Figure 23:
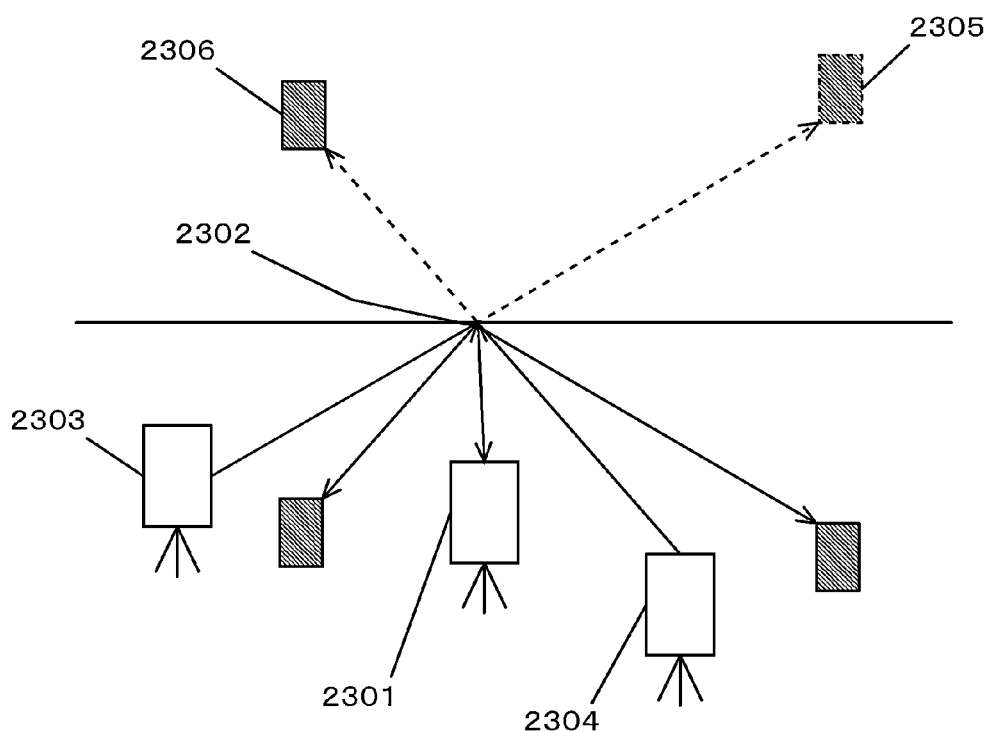
FIG. 23 is a diagram exemplifying extraction of mirror-image point by an extraction unit for mirror-image point data.

Therefore, in order to solve the above deficiency, in the correction apparatus for other viewpoint closed surface pixel value of the fifth embodiment, the mirror-image point data is extracted from the point cloud data for the plurality of viewpoints. FIG. 23 is a diagram exemplifying extraction of mirror-image point by an extraction unit for mirror-image point data. This extraction is carried out by comparing the point cloud data for the plurality of viewpoints. At the outset, a 'measurement point P1' 2302 having high-possibility of being a substantial object (low-possibility of being a mirror image), is selected from the point cloud data measured from the 'viewpoint A' 2301. Specifically, a measurement point, where the distance to the viewpoint A is shorter than a predetermined distance, or a measurement point, where the distance to the viewpoint A is shorter than that of the other viewpoints, is selected from the point cloud data. The reason for this is that the measurement point having the shortest distance from the viewpoint A is most unlikely to be affected by specular reflection. Moreover, a plurality of measurement points P1 may be selected if certain conditions are met. Subsequently, the point cloud data acquired by the 'measurement point P1' 2302 and the 'viewpoint B' 2303, and the point cloud data acquired by the 'measurement point C' 2304 are compared. Specifically, among the point cloud data acquired by the 'measurement point P1' 2302 and the 'viewpoint B' 2303, when viewing from the 'viewpoint B' 2303, it is determined that the 'measurement point P2' 2305 on the extended line of the 'measurement point P1' 2302 is the mirror-image point. Similarly, among the point cloud data acquired by the 'viewpoint C' 2304, when viewing from the 'viewpoint C' 2304, it is determined that the 'measurement point P3' 2306 on the extended line of the 'measurement point P1' 2302 is the mirror-image point. Similarly, the measurement points P4 and P5, which are most unlikely to be affected by specular reflection, are selected from the point cloud data measured by the 'viewpoint B' and 'viewpoint C', thereby carrying out the above process. By carrying out the series of processes, it is possible to extract the mirror-image point data from the point cloud data for the plurality of measurement points.

Moreover, the extraction method is not limited to the above example. For example, there is a case where group point data for one viewpoint has a measurement point at a specific special position, but group point data for another viewpoint has no measurement point at a specific special position despite of no obstruction in front. In such case, it is determined that the measurement point at the specific special position acquired at the one viewpoint is the mirror-image point. In this method, it is not required as the above to preliminarily select the measurement point with high-possibility of being a substantial object (low-possibility of being a mirror image) from the measured point cloud data.

The 'removing section for mirror-image point data' has a function of removing the mirror-image point data from the point cloud data for the single viewpoint. Here, the data of the mirror-image point may be removed by being deleted, or replaced with other data.

Note that any one of the viewpoints from the point cloud data for the plurality of viewpoints may be selected as the single viewpoint, and it is not limited. Moreover, the plurality of viewpoints may be regarded as the single viewpoint respectively, thereby removing the mirror-image point from the point cloud data for the respective viewpoints. By utilizing the point cloud data for the respective viewpoints, from which the mirror-image point has been removed, the processes described in the first to fourth embodiments are carried out, thereby generating a plurality of closed surfaces of other viewpoint, not having the point cloud data. Here, the generation of the closed surfaces of other viewpoint from the respective viewpoints can be carried out in parallel processing using a multi-core processor etc.

<Concrete Configuration of Fifth Embodiment>

The hardware configuration of the correction apparatus for other viewpoint closed surface pixel value of the fifth embodiment is basically the same as that of the correction apparatus for other viewpoint closed surface pixel value of the first embodiment as described with reference to FIG. 8. Hereinafter, description of the acquisition process for plurality of point cloud data, the extraction process for mirror-image point data, and the removing section for mirror-image point data of the correction apparatus for other viewpoint closed surface pixel value of the fifth embodiment will be provided.

At the outset, the CPU acquires the real spatial positional information for a group of measurement points projectable onto a single viewpoint closed surface being a virtual closed surface centering around a single viewpoint, and point cloud data being pixel value information for real spatial positional information with regard to the point cloud data for a plurality of viewpoints, including the single viewpoint and excluding the other viewpoint (acquisition process for plurality of point cloud data).

Specifically, the real special positional information (e.g. coordinate values X, Y, Z, distance, horizontal angle, and vertical angle) of the group of measurement points and the pixel value information thereof (e.g. RGB color information) are acquired by utilizing a laser scanner capable of acquiring the point cloud data on a surface within the scope of 360 degrees in a horizontal direction, correlated with ID of the respective measurement points, and stored in the non-volatile memory. Note that the data may not be acquired directly from the measurement device such as the laser scanner, and may be acquired from the storage device managing the data. Subsequently, the CPU extracts the data of a mirror-image point from the point cloud data for the plurality of viewpoints, where the mirror-image point is a measurement point at a mirror-image position of a real position through a reflecting surface.

Specifically, the viewpoint A is selected from the plurality of viewpoints, from which the point cloud data were acquired, and the measurement point P1, where the distance to the viewpoint A is shorter than that of the other viewpoints, is selected.

Subsequently, the 'measurement points P2, P3, ... ' on the extended line of the measurement point P1 2302 when viewing from the respective viewpoints are extracted as the mirror-image point from the point cloud data for the viewpoints B, C, ..., which have not been selected, thereby storing the IDs of the measurement points. Subsequently, the above process is carried out for the viewpoints B, C, ..., thereby similarly extracting the mirror-image point.

Subsequently, the CPU removes the mirror-image point data from the point cloud data for the single viewpoint (removing process for mirror-image point data). Specifically, the data of the mirror-image point may be deleted from the point cloud data loaded in the RAM, or replaced with other data.

<Processing Flow of Fifth Embodiment>

Figure 24:
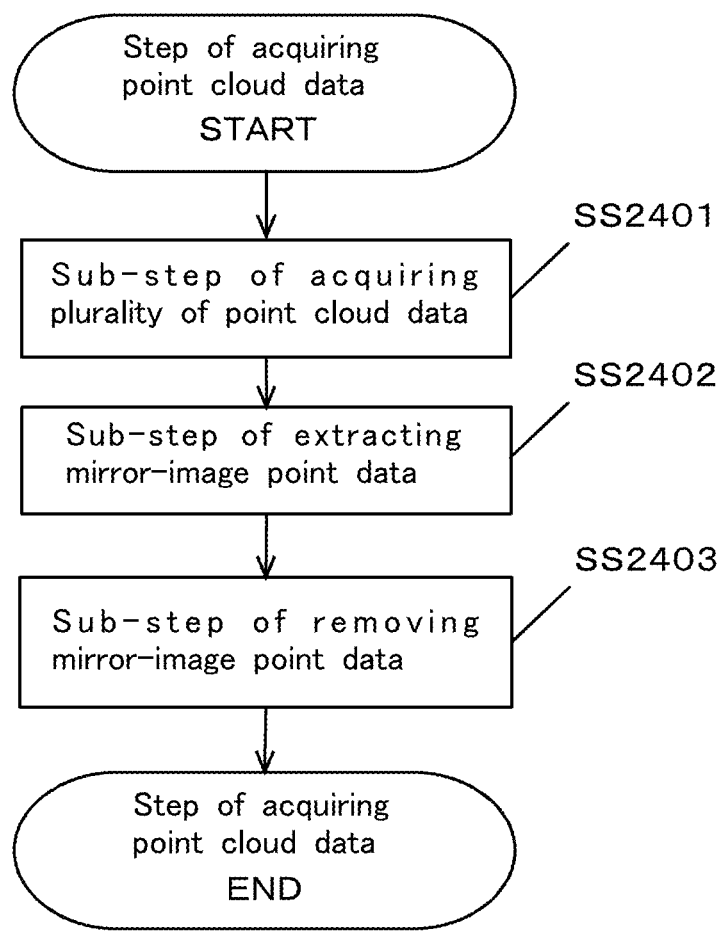
FIG. 24 is a flowchart of a step of acquiring point cloud data of the fifth embodiment.

A flowchart of the correction method for other viewpoint closed surface pixel value of the fifth embodiment is basically the same as that of the correction method for other viewpoint closed surface pixel value of the first embodiment as described with reference to FIG. 9. As shown in FIG. 24, the step of acquiring point cloud data of the correction method for other viewpoint closed surface pixel value of the fifth embodiment comprises the following sub-steps. At the outset, in a sub-step SS2401, the point cloud data for a plurality of viewpoints, including the single viewpoint and excluding the other viewpoint, is acquired (sub-step of acquiring plurality of point cloud data). Subsequently, in a sub-step SS2402, the data of the mirror-image point is extracted from the point cloud data for the plurality of viewpoints, where the mirror-image point is a measurement point at a mirror-image position of a real position through the reflecting surface. Subsequently, in a sub-step SS2403, the mirror-image point data is removed from the point cloud data for the single viewpoint (sub-step of removing mirror-image point data).

<Brief Description of Effects of Fifth Embodiment>

According to the correction apparatus for other viewpoint closed surface pixel value of the fifth embodiment, it is possible to remove the mirror-image point, which does not exist in reality, thereby generating the virtual closed surface image with high quality.

<<Sixth Embodiment>>
<Outline of Sixth Embodiment>

A correction apparatus for other viewpoint closed surface pixel value of a sixth embodiment is basically same as that of the first to fifth embodiments, and acquires data of an forward intersection point from the point cloud data for the plurality of viewpoint, where the forward intersection point is an intersection point of the plurality of viewpoints and the mirror-image points, and adds the data of the forward intersection point data to the group point data for the single view-point as substitute for the removed mirror-image point data. According this feature, it is possible to replace the mirror-image point, which does not exist in reality, with the point on the reflection surface, which exists in reality, thereby generating the virtual closed surface image with higher quality.

<Configuration of Sixth Embodiment>

Figure 25:
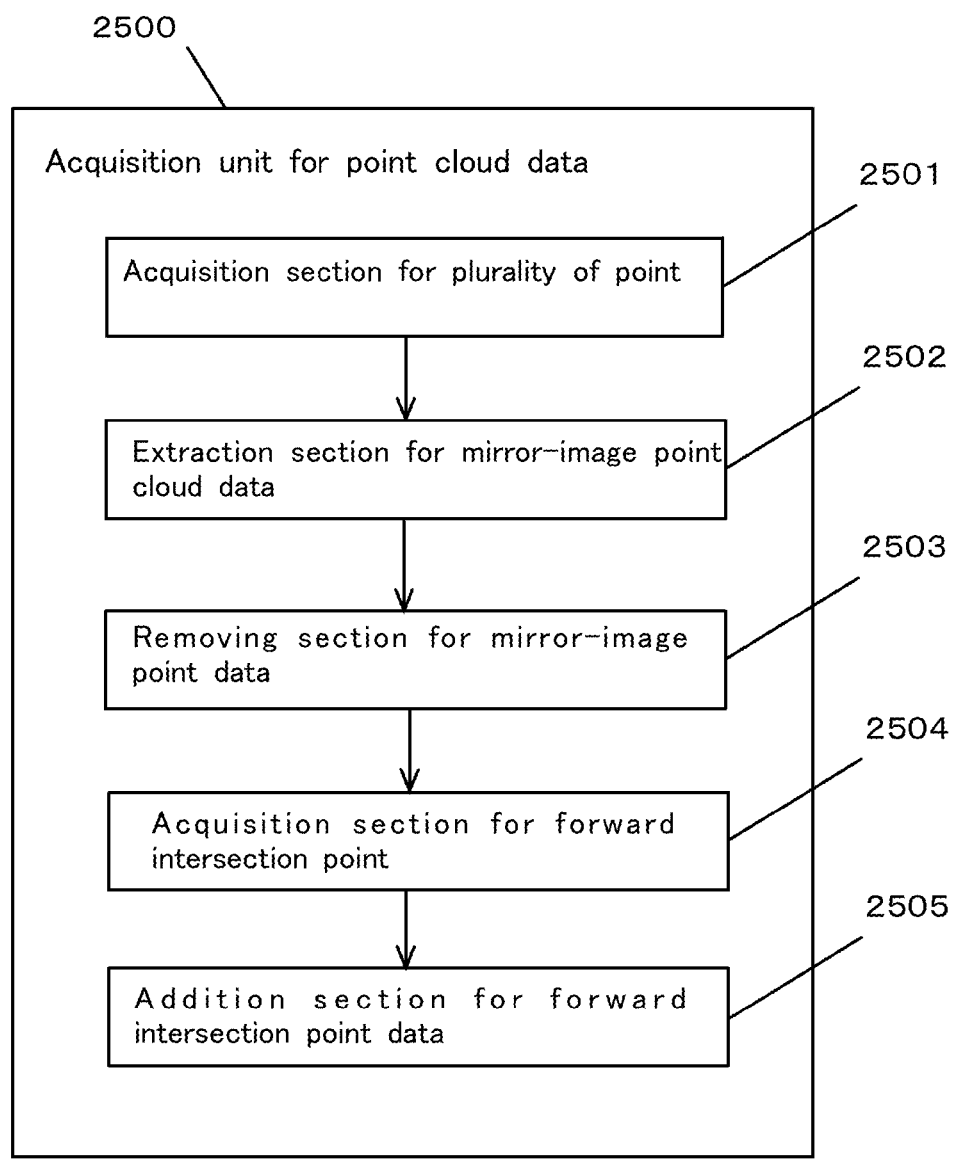
FIG. 25 is a diagram showing a configuration of a correction apparatus for other viewpoint closed surface pixel value of a sixth embodiment.

A configuration of the correction apparatus for other viewpoint closed surface pixel value of the sixth embodiment is basically the same as that of the fifth embodiment as described with reference to FIG. 21. Moreover, as shown in FIG. 25, an 'acquisition unit for point cloud data' 2500 of the correction apparatus for other viewpoint closed surface pixel value of the sixth embodiment comprises an 'acquisition section for plurality of point cloud data' 2501, an 'extraction section for mirror-image point data' 2502, a 'removing section for mirror-image point data' 2503, an 'acquisition section for forward intersection point data' 2504, and an 'addition section for forward intersection point data' 2505. Hereinafter, descriptions of the 'acquisition section for forward intersection point data' 2504, and the 'addition section for forward intersection point data' 2505, which are differences from the fifth embodiment, will be provided.

As described in the fifth embodiment, the method for preliminarily select the measurement point having high-possibility of being a substantial object (low-possibility of being a mirror image) exists. Moreover, a method for extracting the mirror-image point without selecting the measurement point. In this case, it is preferable to further acquire the data to be added to the point cloud data for the single viewpoint as substitute for the extracted mirror-image point data. Hereinafter, an example of the method will be described.

Figure 26:
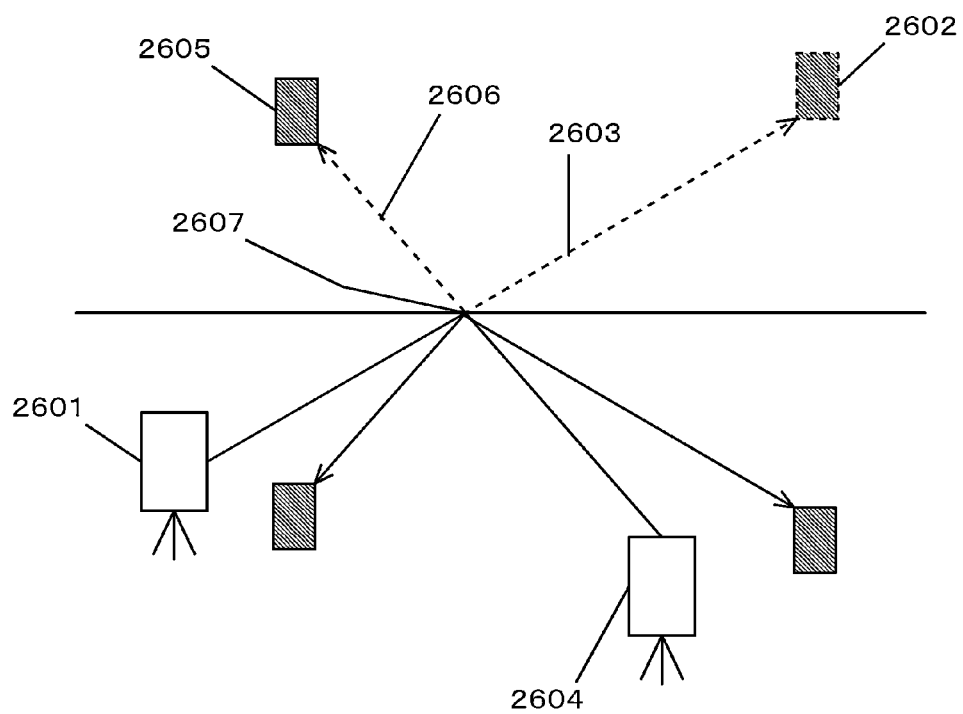
FIG. 26 is a diagram exemplifying extraction of forward intersection point by an extraction section for forward intersection point data.

The 'acquisition section for forward intersection point data' has a function of acquiring data of an forward intersection point from the point cloud data for the plurality of viewpoint, where the forward intersection point is an intersection point of the plurality of viewpoints and the mirror-image points. FIG. 26 is a diagram exemplifying extraction of forward intersection point by an extraction section for forward intersection point data. At the outset, a 'viewpoint A' 2601 and the extracted 'mirror-image point P1' 2602 are connected by a 'virtual straight line L1' 2603. Subsequently, a 'viewpoint B' 2604 and the extracted 'mirror-image point P2' 2605 are connected by a 'virtual straight line L2' 2606. Subsequently, special coordinate of an 'intersection point (forward intersection point)' 2607 of the 'virtual straight line L1' 2603 and the 'virtual straight line L2' 2606 is calculated on the basis of forward intersection. Subsequently, data of the measurement point at the forward intersection point is acquired from the point cloud data for the plurality of viewpoints. When no data of the measurement point exists at the forward intersection point, it is possible to calculate it on the basis of the data of other neighboring measurement points. Specifically, an average value of the neighboring measurement points is calculated as the pixel value of the forward intersection point, or the nearest measurement point may be acquired as the pixel value of the forward intersection point.

The 'addition section for forward intersection point data' has a function of adding the data of the forward intersection point to the group point data for the single viewpoint as substitute for the removed mirror-image point data. Here, when a plurality of mirror-image points are replaced with one forward intersection point, only one forward intersection point data is sufficient for the process, and it is not required to add forward intersection point data for the respective removed mirror-image point data.

<Concrete Configuration of Sixth Embodiment>

The hardware configuration of the correction apparatus for other viewpoint closed surface pixel value of the sixth embodiment is basically the same as that of the correction apparatus for other viewpoint closed surface pixel value of the first embodiment as described with reference to FIG. 8. Hereinafter, description of the acquisition process for forward intersection point data and the addition process for forward intersection point data of the correction apparatus for other viewpoint closed surface pixel value of the sixth embodiment will be provided.

At the outset, the CPU acquires the data of the forward intersection point from the point cloud data for the plurality of viewpoint, where the forward intersection point is an intersection point of the plurality of viewpoints and the mirror-image points (acquisition process for forward intersection point data). Specifically, an arbitrary viewpoint and the mirror-image point extracted for the viewpoint are connected by a virtual straight line. Subsequently, other viewpoint and the mirror-image point extracted for the viewpoint are connected by a virtual straight line. Subsequently, special coordinate of an intersection point (forward intersection point) of the two virtual straight lines is calculated on the basis of forward intersection. Moreover, the pixel value of the forward intersection point is calculated on the basis of the neighboring measurement points.

Subsequently, the CPU adds the data of the forward intersection point to the group point data for the single viewpoint as substitute for the removed mirror-image point data (addition process for forward intersection point data). Specifically, the pixel value and the special coordinate information of the forward intersection point are added to the point cloud data for the single viewpoint loaded in the RAM.

<Processing Flow of Sixth Embodiment>

Figure 27:
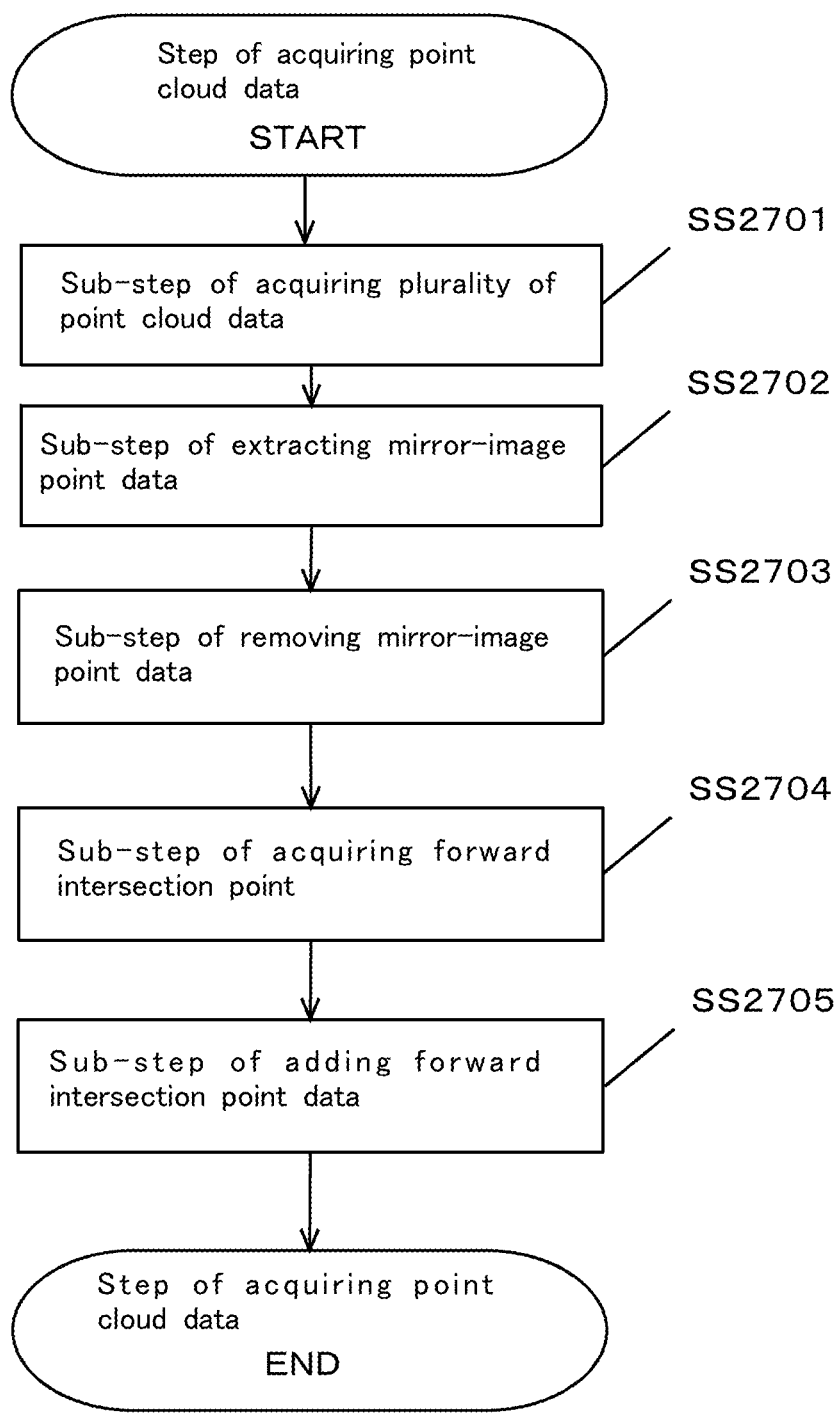
FIG. 27 is a flowchart of a step of acquiring point cloud data of the sixth embodiment.

A flowchart of the correction method for other viewpoint closed surface pixel value of the sixth embodiment is basically the same as that of the correction method for other viewpoint closed surface pixel value of the first embodiment as described with reference to FIG. 9. As shown in FIG. 27, the step of acquiring the point cloud data of the correction method for other viewpoint closed surface pixel value of the sixth embodiment comprises the following sub-steps. At the outset, in a sub-step SS2701, the point cloud data for a plurality of viewpoints, including the single viewpoint and excluding the other viewpoint, is acquired (sub-step of acquiring plurality of point cloud data). Subsequently, in a sub-step SS2702, the data of the mirror-image point is extracted from the point cloud data for the plurality of viewpoints, where the mirror-image point is a measurement point at a mirror-image position of a real position through the reflecting surface. Subsequently, in a sub-step SS2703, the mirror-image point data is removed from the point cloud data for the single viewpoint (sub-step of removing mirror-image point data). Subsequently, in a sub-step SS2704, the data of the forward intersection point is acquired from the point cloud data for the plurality of viewpoint, where the forward intersection point is an intersection point of the plurality of viewpoints and the mirror-image points (sub-step of acquiring forward intersection point). Subsequently, in a sub-step SS2705, the data of the forward intersection point is added to the group point data for the single viewpoint as substitute for the removed mirror-image point data (sub-step of adding forward intersection point data).

<Brief Description of Effects of Sixth Embodiment>

According to the correction apparatus for other viewpoint closed surface pixel value of the sixth embodiment, it is possible to replace the mirror-image point, which does not exist in reality, with the point on the reflection surface, which exists in reality, thereby generating the virtual closed surface image with higher quality.

<<Seventh Embodiment>>

<Outline of Seventh Embodiment>

An output apparatus for user location information of a seventh embodiment stores the pixel information on the plurality of viewpoint closed surface outputted by the correction apparatus for other viewpoint closed surface pixel value of the first to sixth embodiments as the database. Moreover, when acquiring an image shot at an arbitrary viewpoint, output apparatus for user location information of a seventh embodiment determines whether a pixel value distribution having a predetermined correlation with a pixel value distribution of the image among the stored pixel value distribution on the plurality of viewpoint closed surfaces, and when the pixel value distribution with the predetermined correlation exists, outputs the viewpoint of the viewpoint closed surface having the pixel value distribution with the predetermined correlation. According to this configuration, it is possible to specify the viewpoint of the shot image only by shooting the image.

<Configuration of Seventh Embodiment>

Figure 28:
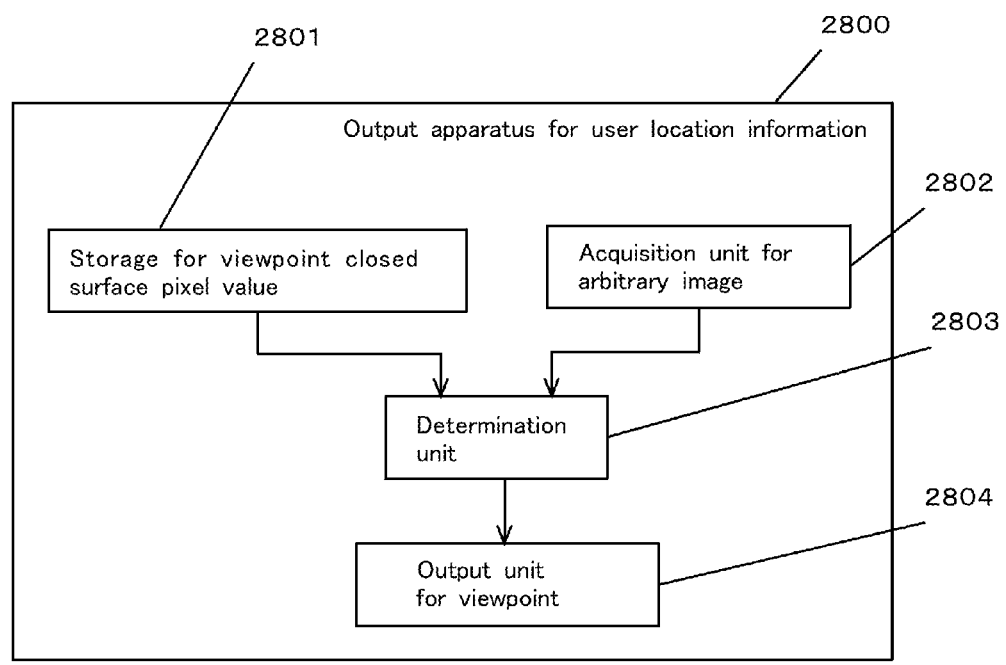
FIG. 28 is a diagram showing a configuration of an output apparatus for user location information of a seventh embodiment.

FIG. 28 is a diagram showing a configuration of an output apparatus for user location information of the seventh embodiment. As shown in FIG. 28, an 'output apparatus for user location information' of the seventh embodiment comprises a 'storage for viewpoint closed surface pixel value' 2801, an 'acquisition unit for arbitrary image' 2802, a 'determination unit' 2803, and an 'output unit for viewpoint' 2804.

The 'storage for viewpoint closed surface pixel value' 2801 has a function of storing the pixel values on the plurality of viewpoint closed surfaces acquired by the correction apparatus for other viewpoint closed surface pixel value described in the first to sixth embodiments. Specifically, a long-term storage for storing the pixel values on the plurality of viewpoint closed surfaces works. The output apparatus for user location information and the correction apparatus for other viewpoint closed surface pixel value may be connected through wired or wireless communication means, or may be configured as one apparatus and connected through a system bus. Moreover, the output apparatus for user location information may acquire the pixel value on the plurality of viewpoint closed surfaces acquired by the correction apparatus for other viewpoint closed surface pixel value from a storage for the pixel value.

As described in the first to fourth embodiments, the correction apparatus for other viewpoint closed surface pixel value can generate the virtual closed surface image with high quality centering around the other viewpoint on the basis of the real spatial positional information and the pixel value information for the group of measurement points acquired by centering around the single viewpoint. Therefore, it is possible to generate the virtual closed surface image with high quality of many viewpoints on the basis of the point cloud data of the limited viewpoint. In the conventional technology, it is required to shoot images at the respective viewpoints, so that images of many viewpoints cannot be acquired. Meanwhile, the output apparatus for user location information of the seventh embodiment can acquire the closed surface images of many viewpoints from the correction apparatus for other viewpoint closed surface pixel value.

The 'acquisition unit for arbitrary image' has a function of acquiring an image shot at an arbitrary viewpoint, where the viewpoint is unknown. The terms 'viewpoint is unknown' means that the viewpoint information are not correlated with the shot image, and this does not place other conditions. For example, it does not exclude the situation where a person who shoots the image comprehends the viewpoint information.

Specifically, an image shot at an arbitrary position may be acquired from the imager through the wired or wireless communication means, or through a storage medium storing the image. Examples of the imager include a mobile terminal having a function of imaging, or a digital camera. The imager is not limited, and any imager may be used. Moreover, when the output apparatus for user location information is provided with an imaging means, the image shot by the imaging means may be acquired.

The 'determination unit' has a function of determining whether a pixel value distribution having a predetermined correlation with a pixel value distribution of the image acquired by the acquisition unit for arbitrary image among the pixel value distribution on the plurality of viewpoint closed surfaces stored in the storage for viewpoint closed surface pixel value. Specifically, matching process between the pixel value distribution on the plurality of viewpoint closed surfaces and the pixel value distribution of the shot image is carried out, and it is determined whether a pixel value distribution having a correlation higher than a predetermined level exists among the pixel value distributions on the viewpoint closed surfaces.

For example, the shot image is superimposed on every area in the viewpoint closed surface as a target for the matching process, thereby calculating a sum of absolute values (or square value) of difference of the pixel value in the predetermined area on viewpoint closed surface and the shot image. Moreover, it is determined whether there is an area where the sum is less than or equal to a predetermined value among the selected viewpoint closed surface images. When it is determined that no area where the sum is less than or equal to a predetermined value exists, the same process is carried out for the other viewpoint closed surface. When it is determined that area where the sum is less than or equal to a predetermined value exists in the viewpoint closed surface images, ID of the viewpoint closed surface image is stored. When no area having the correlation was found in matching of all viewpoint closed surfaces, information indicating that no area exists is stored.

Moreover, other than the above matching process, a matching using normalized cross correlation and a matching on the basis of phase only correlation may be utilized, and the matching process is not limited. Moreover, it is not necessary to use all pixel value information of the shot image for the matching, and it is possible to use partial pixel value information. For example, it is possible to carry out matching process by utilizing a feature of the pixel value of edge portion in the shot image (e.g. shape of outline or edge line), thereby improving matching accuracy irrespective of variation by time zone, season, and sunlight.

The 'output unit for viewpoint' has a function of outputting the viewpoint of the viewpoint closed surface having the pixel value distribution with the predetermined correlation as the value of the unknown viewpoint when the determination by the determination unit indicates that the pixel value distribution with the predetermined correlation exists. Here, the viewpoint information may be outputted to the imager through a communication means, or may be outputted through display means, voice means, or printing means of the output apparatus for user location information, or stored in a long-term storage.

<Concrete Configuration of Seventh Embodiment>

The hardware configuration of the output apparatus for user location information of the seventh embodiment is basically the same as that of the correction apparatus for other viewpoint closed surface pixel value of the first embodiment as described with reference to FIG. 8. The output apparatus for user location information and the correction apparatus for other viewpoint closed surface pixel value may be an integrated apparatus configured by shared hardware. Hereinafter, the case embodied as separate apparatus will be described.

At the outset, the CPU receives the pixel value information on the plurality of viewpoints closed surfaces from the correction apparatus for other viewpoint closed surface pixel value connected through LAN, and stores the information in the long-term storage (e.g. non-volatile memory or hard disk) (storing process for viewpoint closed surface pixel value). Subsequently, the CPU receives the shot image including no information of shooting position from the imager through a communication unit, and stores the image in the RAM (acquisition process for arbitrary image).

Subsequently, the CPU reads out the pixel value information on the plurality of viewpoints closed surfaces stored in the long-term storage to the RAM, determines whether the pixel value distribution having the predetermined correlation with the pixel value distribution of the shot image exists among the pixel value distributions on the viewpoint closed surfaces, and stores the determination result into the RAM (determination process). Here, examples of the determination result includes the information as to which viewpoint closed surface image includes the pixel value distribution having the predetermined correlation with the pixel value distribution of the shot image (e.g. ID of the corresponding viewpoint closed surface image), or information as to which area in the viewpoint closed surface includes the pixel value distribution (e.g. 2D coordinate information of the corresponding area). The former information is used for specifying the viewpoint, and the latter information is used for specifying the direction of a line of sight at the viewpoint Subsequently, when the determination result indicates that the pixel value distribution having the predetermined correlation exists, the CPU transmits the information of the viewpoint of the viewpoint closed surface having the pixel distribution to a mobile terminal through a communication unit. Moreover, it is possible to simultaneously transmit the information of the direction of the line of sight in addition to the information of the viewpoint.

<Processing Flow of Seventh Embodiment>

Figure 29:
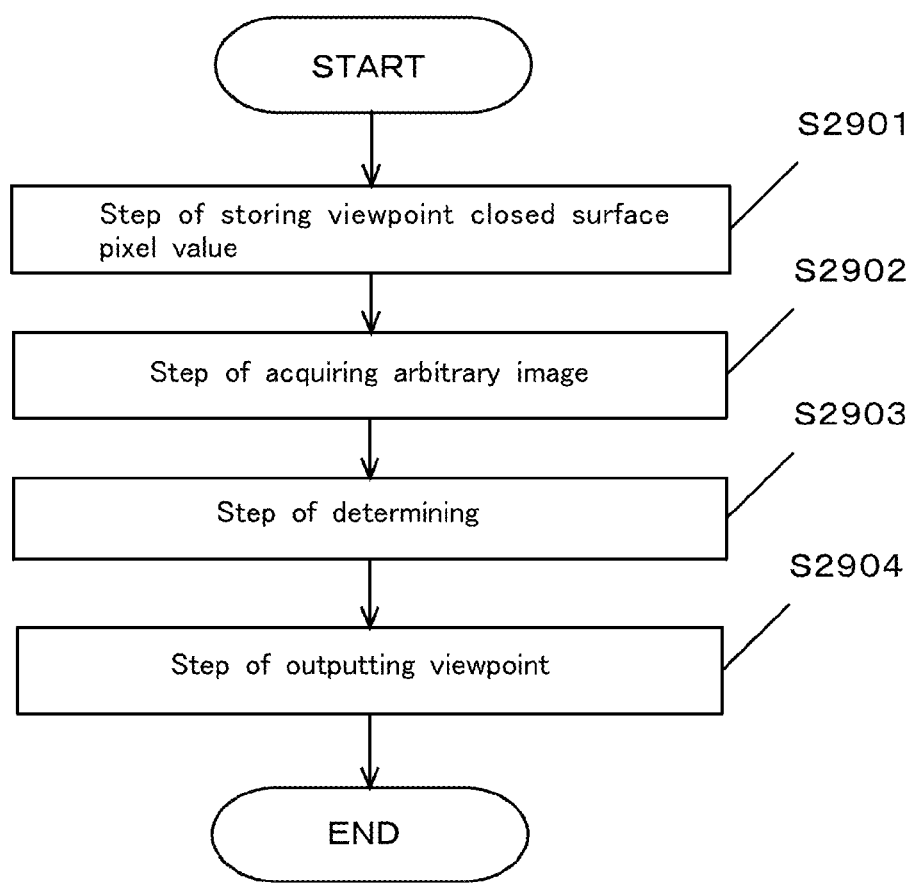
FIG. 29 is a flowchart of an output method for user location information of the seventh embodiment.

FIG. 29 is a flowchart of an output method for user location information of the seventh embodiment. The processing flow of FIG. 29 includes the following steps. At the outset, in a step S2901, the pixel value information on the plurality of viewpoints acquired by the closed surfaces from the correction method for other viewpoint closed surface pixel value are stored in the storage medium (step of storing viewpoint closed surface pixel value). Subsequently, in a step S2902, the image shot at the arbitrary viewpoint where the location of the viewpoint is unknown (step of acquiring arbitrary image). Subsequently, in a step S2903, it is determined whether the pixel value distribution having the predetermined correlation with the pixel value distribution of the shot image exists among the pixel value distributions on the viewpoint closed surfaces (step of determining). Subsequently, in a step S2904, when the determination by the determination unit indicates that the pixel value distribution with the predetermined correlation exists, the viewpoint of the viewpoint closed surface having the pixel value distribution with the predetermined correlation is outputted as the value of the unknown viewpoint (step of outputting viewpoint).

<Concrete Application>

Moreover, it is possible to carry out route navigation by utilizing the output apparatus for user location information. Here, the case where the route navigation is carried out for the user who has the mobile terminal having imaging function, will be described. Here, the correction apparatus for other viewpoint closed surface pixel value preliminarily acquires the point cloud data for a single viewpoint or a plurality of viewpoints as to the area as a target for the route navigation, thereby generating the closed surface image of the other viewpoint. Moreover, the output apparatus for user location information receives the closed surface image data of the plurality of viewpoints generated by the correction apparatus for other viewpoint closed surface pixel value through the communication means, and stores the data. Note that the viewpoint for generating the closed surface may be automatically selected at a predetermined interval on the basis of the information of moving route and secondary route around the route, or a service provider or the route navigation may manually select the viewpoint.

Figure 30:
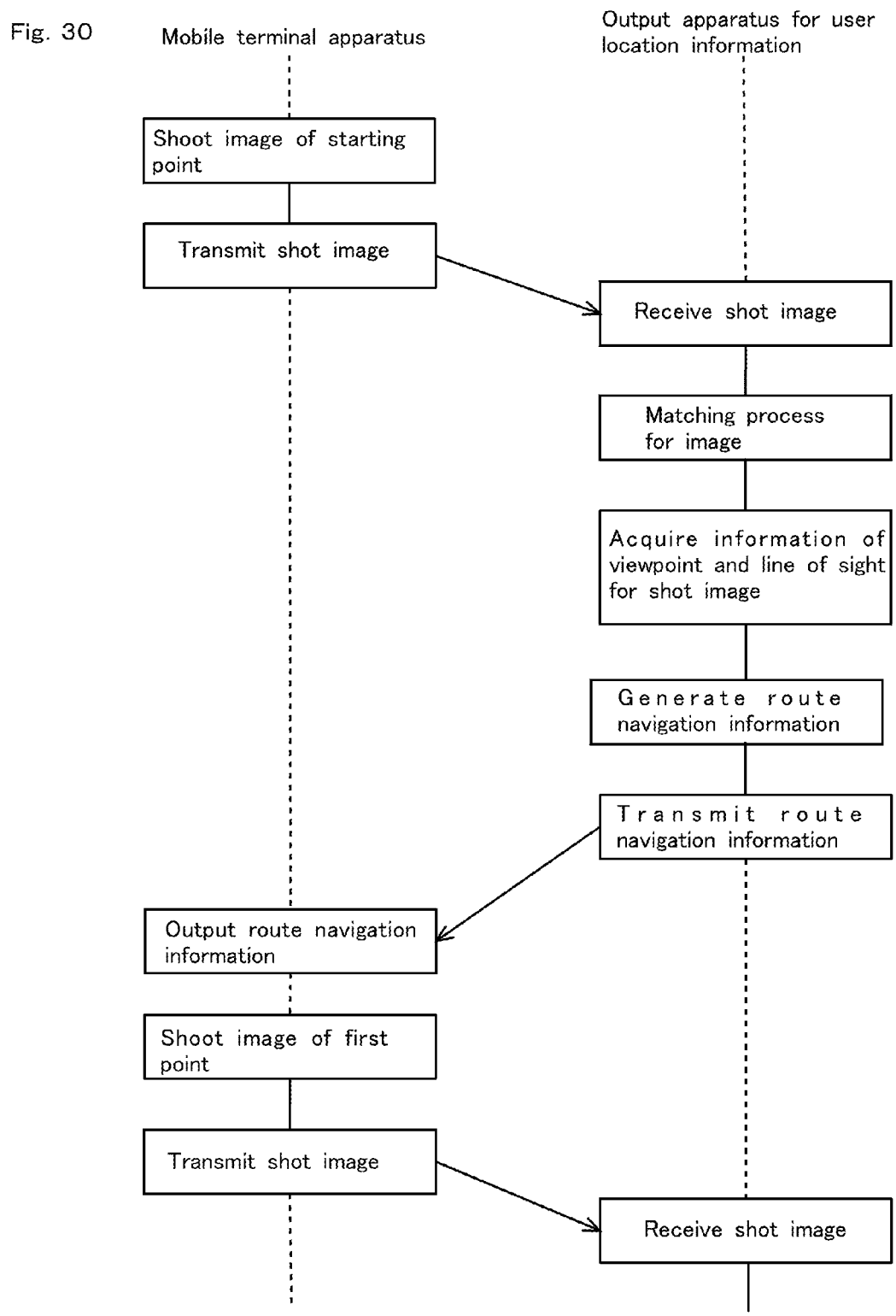
FIG. 30 is a flowchart of each apparatus when performing route navigation.

FIG. 30 is a flowchart of each apparatus when performing route navigation. At the outset, the mobile terminal shoots an image of the starting point according to an operation input from a user, and transmits the shot image to the output apparatus for user location information. Subsequently, the mobile terminal receives an operation input from the user, and transmits the shot image to the output apparatus for user location information.

The output apparatus for user location information receives the shot image from the mobile terminal. Subsequently, the output apparatus for user location information determines by matching process whether the pixel value distribution having the correlation with the pixel value distribution of the received shot image, where the correlation is higher than a predetermined level, exists among the pixel value distributions on the viewpoint closed surfaces. Here, when the determination by the determination unit indicates that the pixel value distribution with the predetermined correlation exists, the information as to which viewpoint closed surface image includes the pixel value distribution (information of viewpoint), or the information as to which area in the viewpoint closed surface includes the pixel value distribution (information of line if sight) are acquired.

The output apparatus for user location information generates the route information for navigating the user to the initial target point (route information for navigation) on the basis of the viewpoint information and the information of line of sight of the shot image. Here, the route information for navigation includes the information indicating the direction and distance that the user should go, and the information of the closed surface including the route that the user should go.

The mobile terminal receives the route information for navigation from the output apparatus for user location information, and carries out visual and/or audio output of the information. The user understands the moving direction and the moving distance on the basis of the outputted route information for navigation, and goes to the initial target point. Subsequently, the mobile terminal receives the operation output from the user who reaches to the initial target point, shoots the image of arbitrary viewpoint and line of sight, and transmits the image to the output apparatus for user location information. The subsequent processes are the same as described above.

<Brief Description of Effects of Seventh Embodiment>

According to this configuration, it is possible to specify the viewpoint of the shot image only by shooting the image.

DESCRIPTION OF REFERENCE NUMERALS

0100 Correction apparatus for other viewpoint closed surface pixel value, 0101 Acquisition unit for point cloud data, 0102 Acquisition unit for coordinate information on single viewpoint closed surface, 0103 Acquisition unit for coordinate information on other viewpoint closed surface, 0104 Extraction unit for hidden point, 0105 First correction unit for hidden point pixel value (Second correction unit for hidden point pixel value), 0801 CPU, 0802 RAM, 0803 ROM, 0804 Communication unit, 0805 Display unit, 0806 Non-volatile memory, 1000 First correction unit for hidden point pixel value, 1001 Extraction section for first nearest projection point, 1002 Extraction section for first short-range projection point, 1003 First correction section for hidden point pixel value, 1103 Determination section for distance difference, 1104 Second correction section for hidden point pixel value, 1603 Extraction unit for data missing point, 1604 Interpolation unit for data missing point pixel value, 1901 Extraction section for second nearest projection point, 1902 Extraction section for second short-range projection point, 1903 Interpolation section for data missing point pixel value, 2100 Acquisition unit for point cloud data, 2101 Acquisition section for plurality of point cloud data, 2102 Extraction section for mirror-image point data, 2103 Removing section for mirror-image point data, 2504 Acquisition section for forward intersection point, 2505 Addition section for forward intersection point data

What is claimed is:

1. A correction apparatus for other viewpoint closed surface pixel value, comprising:

an acquisition unit for point cloud data, acquiring real spatial positional information for a group of measurement points projectable onto a single viewpoint closed surface being a virtual closed surface centering around a single viewpoint, and point cloud data being pixel value information for real spatial positional information;

an acquisition unit for coordinate information on single viewpoint closed surface, acquiring coordinate information on the single viewpoint closed surface, the coordinate information on the closed surface for a group of projection points acquired by projecting the group of measurement points on the single viewpoint closed surface;

an acquisition unit for coordinate information on other viewpoint closed surface, acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface;

an extraction unit for hidden point, extracting a hidden point on a basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint, the hidden point being a measurement point hidden behind a physical surface, where the data cannot be acquired when acquiring the point cloud data by centering around the other viewpoint; and a first correction unit for hidden point pixel value, correcting a pixel value of the projection point on the other viewpoint closed surface for the hidden point extracted by the extraction unit for hidden point by utilizing the distance from the measurement point projected onto the neighboring projection point on the other viewpoint closed surface to another viewpoint position and the pixel value of the measurement point.

2. The correction apparatus for other viewpoint closed surface pixel value according to claim 1,
wherein the first correction unit for hidden point pixel value further comprises
an extraction section for first nearest projection point, extracting a first nearest projection point from a first marked point cloud, the first nearest projection point being a projection point for a measurement point with shortest distance to the other viewpoint, the first marked point cloud being a group of projection points neighboring the projection point on the other viewpoint closed surface for the hidden point extracted by the extraction unit for hidden point,
an extraction section for first short-range projection point, extracting a first short-range projection point from the first marked point cloud, the first short-range projection point being a projection point for a measurement point within a predetermined range from the measurement point projected onto the first nearest projection point, and
a first correction section for hidden point pixel value, correcting the pixel value of the projection point on the other viewpoint closed surface for the hidden point by utilizing the pixel value of the first nearest projection point and the first short-range projection point.

3. The correction apparatus for other viewpoint closed surface pixel value according to claim 1, comprising:
as substitute for the first correction unit for hidden point pixel value, a second correction unit for hidden point pixel value, correcting the pixel value of the projection point on the other viewpoint closed surface for the hidden point, extracted by the extraction unit for hidden point, using distance from the hidden point to the other viewpoint, and the distance from the measurement point projected onto the neighboring projection point on the other viewpoint closed surface to another viewpoint position and the pixel value of the measurement point.

4. The correction apparatus for other viewpoint closed surface pixel value according to claim 3,
wherein the second correction unit for hidden point pixel value further comprises
an extraction section for first nearest projection point, extracting a first nearest projection point from a first marked point cloud, the first nearest projection point being a projection point for a measurement point with shortest distance to the other viewpoint, the first marked point cloud being a group of projection points neighboring the projection point on the other viewpoint closed surface for the hidden point extracted by the extraction unit for hidden point,
an extraction section for first short-range projection point, extracting a first short-range projection point from the first marked point cloud, the first short-range projection point being a projection point for a measurement point within a predetermined range from the measurement point projected onto the first nearest projection point, a determination section for distance difference, determining whether a difference between distance from the hidden point to the other viewpoint and the distance from the measurement point projected onto the first nearest projection point to the other viewpoint is more than or equal to a predetermined value, and
a second correction section for hidden point pixel value, correcting the pixel value of the projection point on the other viewpoint closed surface for the hidden point using the pixel value of the nearest projection point and the first short-range projection point, when the determination by the determination section for distance difference indicates that the distance difference is more than or equal to the predetermined value.

5. A correction apparatus for other viewpoint closed surface pixel value, comprising:
an acquisition unit for point cloud data, acquiring real spatial positional information for a group of measurement points projectable onto a single viewpoint closed surface being a virtual closed surface centering around a single viewpoint, and point cloud data being pixel value information for real spatial positional information;
an acquisition unit for coordinate information on other viewpoint closed surface, acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface;
an extraction unit for data missing point, extracting a data missing point on a basis of a relative positional relationship between a projection point on the other viewpoint closed surface for the arbitrary measurement point and a projection point neighboring the projection point on the other viewpoint closed surface for the arbitrary measurement point, the data missing point being a projection point to be located on the other viewpoint closed surface when acquiring the point cloud data by centering around the other viewpoint, but having no data; and
an interpolation unit for data missing point pixel value, interpolating a pixel value of the data missing point extracted by the extraction unit for data missing point on a basis of the distance from the measurement point projected onto the neighboring projection point on the other viewpoint closed surface to another viewpoint position and the pixel value of the measurement point.

6. The correction apparatus for other viewpoint closed surface pixel value according to claim 5,
wherein the interpolation unit for data missing point pixel value further comprises
an extraction section for second nearest projection point, extracting a second nearest projection point from a second marked point cloud, the second nearest projection point being a projection point for a measurement point with shortest distance to the other viewpoint, the second marked point cloud being a group of projection points on the other viewpoint closed surface neighboring the data missing point extracted by the extraction unit for data missing point,
an extraction section for second short-range projection point, extracting a second short-range projection point from the second marked point cloud, the second short-range projection point being a projection point for a measurement point within a predetermined range from the measurement point for the second nearest projection point, and an interpolation section for data missing point pixel value, interpolating the pixel value of the data missing point by utilizing the pixel values of the second nearest projection point and the second short-range projection point.

7. The correction apparatus for other viewpoint closed surface pixel value according to claim 1,
wherein the acquisition unit for point cloud data further comprises
an acquisition section for plurality of point cloud data, acquiring the point cloud data for a plurality of viewpoints, including the single viewpoint and excluding the other viewpoint,
an extraction section for mirror-image point data, extracting data of a mirror-image point from the point cloud data for the plurality of viewpoints, the mirror-image point being a measurement point at a mirror-image position of a real position through a reflecting surface, and
a removing section for mirror-image point data, removing the mirror-image point data from the point cloud data for the single viewpoint.

8. The correction apparatus for other viewpoint closed surface pixel value according to claim 7,
wherein the acquisition unit for point cloud data further comprises
an acquisition section for forward intersection point data, acquiring data of an forward intersection point from the point cloud data for the plurality of viewpoint, the forward intersection point being an intersection point of the plurality of viewpoints and the mirror-image points, and
an addition section for forward intersection point data, adding the data of the forward intersection point to the group point data for the single viewpoint as substitute for the removed mirror-image point data.

9. A correction method for other viewpoint closed surface pixel value, comprising the steps of:
acquiring real spatial positional information for a group of measurement points projectable onto a single viewpoint closed surface being a virtual closed surface centering around a single viewpoint, and point cloud data being pixel value information for real spatial positional information;
acquiring coordinate information on the single viewpoint closed surface, the coordinate information on the closed surface for a group of projection points acquired by projecting the group of measurement points on the single viewpoint closed surface;
acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface;
extracting a hidden point on a basis of a relative positional relationship between a projection point on the single viewpoint closed surface for an arbitrary measurement point and a projection point neighboring the projection point on the single viewpoint closed surface for the arbitrary measurement point, a relative positional relationship between a projection point on the other viewpoint closed surface for the arbitrary measurement point and a projection point neighboring the projection point on the other viewpoint closed surface for the arbitrary measurement point, distance from the arbitrary measurement point to the other viewpoint, and distance from the measurement point projected onto the neighboring projection point on the other viewpoint closed surface to the other viewpoint, the hidden point being a measurement point hidden behind a physical surface, where the data cannot be acquired when acquiring the point cloud data by centering around the other viewpoint; and
first correcting a pixel value of the projection point on the other viewpoint closed surface for the hidden point extracted by the step of extracting hidden point by utilizing the distance from the measurement point projected onto the neighboring projection point on the other viewpoint closed surface to another viewpoint position and the pixel value of the measurement point.

10. The correction method for other viewpoint closed surface pixel value according to claim 9,
wherein the step of first correcting hidden point pixel value further comprises the sub-steps of,
extracting a first nearest projection point from a first marked point cloud, the first nearest projection point being a projection point for a measurement point with shortest distance to the other viewpoint, the first marked point cloud being a group of projection points neighboring the projection point on the other viewpoint closed surface for the hidden point extracted by the step of extracting hidden point,
extracting a first short-range projection point from the first marked point cloud, the first short-range projection point being a projection point for a measurement point within a predetermined range from the measurement point projected onto the first nearest projection point, and
first correcting the pixel value of the projection point on the other viewpoint closed surface for the hidden point by utilizing the pixel value of the first nearest projection point and the first short-range projection point.

11. The correction method for other viewpoint closed surface pixel value according to claim 9, comprising the steps of:
as substitute for the step of first correcting hidden point pixel value, second correcting the pixel value of the projection point on the other viewpoint closed surface for the hidden point, extracted by the extraction unit for hidden point, using distance from the hidden point to the other viewpoint, and the distance from the measurement point projected onto the neighboring projection point on the other viewpoint closed surface to another viewpoint position and the pixel value of the measurement point.

12. The correction method for other viewpoint closed surface pixel value according to claim 11,
wherein the step of second correcting hidden point pixel value further comprises the sub-steps of,
extracting a first nearest projection point from a first marked point cloud, the first nearest projection point being a projection point for a measurement point with shortest distance to the other viewpoint, the first marked point cloud being a group of projection points neighboring the projection point on the other viewpoint closed surface for the hidden point extracted by the step of extracting hidden point,
extracting a first short-range projection point from the first marked point cloud, the first short-range projection point being a projection point for a measurement point within a predetermined range from the measurement point projected onto the first nearest projection point,
determining whether a difference between distance from the hidden point to the other viewpoint and the distance from the measurement point projected onto the first nearest projection point to the other viewpoint is more than or equal to a predetermined value, and
second correcting the pixel value of the projection point on the other viewpoint closed surface for the hidden point using the pixel value of the nearest projection point and the first short-range projection point, when the determination by the sub-step of determining distance difference indicates that the distance difference is more than or equal to the predetermined value.

13. A correction method for other viewpoint closed surface pixel value, comprising the steps of;

acquiring real spatial positional information for a group of measurement points projectable onto a single viewpoint closed surface being a virtual closed surface centering around a single viewpoint, and point cloud data being pixel value information for real spatial positional information;

acquiring coordinate information on other viewpoint closed surface being a virtual closed surface centering around another viewpoint different from the single viewpoint, the coordinate information on the closed surface for a group of projection points acquired by projecting the group of measurement points on the other viewpoint closed surface;

extracting a data missing point on a basis of a relative positional relationship between a projection point on the other viewpoint closed surface for the arbitrary measurement point and a projection point neighboring the projection point on the other viewpoint closed surface for the arbitrary measurement point, the data missing point being a projection point to be located on the other viewpoint closed surface when acquiring the point cloud data by centering around the other viewpoint; and interpolating a pixel value of the data missing point extracted by the step of extracting data missing point on a basis of the distance from the measurement point projected onto the neighboring projection point on the other viewpoint closed surface to another viewpoint position and the pixel value of the measurement point.

14. The correction method for other viewpoint closed surface pixel value according to claim 13, wherein the step of interpolating data missing point pixel value further comprises the sub-steps of, extracting a second nearest projection point from a second marked point cloud, the second nearest projection point being a projection point for a measurement point with shortest distance to the other viewpoint, the second marked point cloud being a group of projection points on the other viewpoint closed surface neighboring the data missing point extracted by the step of extracting data missing point, extracting a second short-range projection point from the second marked point cloud, the second short-range projection point being a projection point for a measurement point within a predetermined range from the measurement point for the second nearest projection point, and interpolating the pixel value of the data missing point by utilizing the pixel value of the second nearest projection point and the second short-range projection point.

15. The correction method for other viewpoint closed surface pixel value according to claim 9, wherein the step of acquiring point cloud data further comprises the sub-steps of, acquiring the point cloud data for a plurality of viewpoints, including the single viewpoint and excluding the other viewpoint, extracting data of a mirror-image point from the point cloud data for the plurality of viewpoints, the mirror-image point being a measurement point at a mirror-image position of a real position through a reflecting surface, and removing the mirror-image point data from the point cloud data for the single viewpoint.

16. The correction method for other viewpoint closed surface pixel value according to claim 15, wherein the step of acquiring point cloud data further comprises the sub-steps of, acquiring data of an forward intersection point from the point cloud data for the plurality of viewpoint, the forward intersection point being an intersection point of the plurality of viewpoints and the mirror-image points, and adding the data of the forward intersection point to the group point data for the single viewpoint as substitute for the removed mirror-image point data.

17. An output apparatus for user location information, comprising:

a storage for viewpoint closed surface pixel value, storing the pixel values on the plurality of viewpoint closed surfaces acquired by the correction apparatus for other viewpoint closed surface pixel value according to claim 1;

an acquisition unit for arbitrary image, acquiring an image shot at an arbitrary viewpoint, the viewpoint is unknown;

a determination unit, determining whether a pixel value distribution having a predetermined correlation with a pixel value distribution of the image acquired by the acquisition unit for arbitrary image among the pixel value distribution on the plurality of viewpoint closed surfaces stored in the storage for viewpoint closed surface pixel value; and an output unit for viewpoint, outputting the viewpoint of the viewpoint closed surface having the pixel value distribution with the predetermined correlation as the value of the unknown viewpoint when the determination by the determination unit indicates that the pixel value distribution with the predetermined correlation exists.

18. An output method for user location information, comprising the steps of:

storing the pixel values on the plurality of viewpoint closed surfaces acquired by the correction method for other viewpoint closed surface pixel value according to claim 9;

acquiring an image shot at an arbitrary viewpoint, the viewpoint is unknown;

determining whether a pixel value distribution having a predetermined correlation with a pixel value distribution of the image acquired by the step of acquiring arbitrary image among the pixel value distribution on the plurality of viewpoint closed surfaces stored by the step of storing viewpoint closed surface pixel value; and outputting the viewpoint of the viewpoint closed surface having the pixel value distribution with the predetermined correlation as the value of the unknown viewpoint when the determination by the step of determining indicates that the pixel value distribution with the predetermined correlation exists.

* * * * *